US012798082B2

(12) United States Patent
DeHoff

(10) Patent No.: US 12,798,082 B2
(45) Date of Patent: Nov. 17, 2026

(54) DIFFERENTIAL WINDLASS ROBOTIC JOINT

(71) Applicant: Schaeffler Technologies AG & Co. KG, Herzogenaurach (DE)

(72) Inventor: Kyle DeHoff, Canal Fulton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/041,457

(22) Filed: Jan. 30, 2025

(65) Prior Publication Data

US 2026/0216866 A1 Jul. 30, 2026

(51) Int. Cl.
*B25J 9/10* (2006.01)

(52) U.S. Cl.
CPC .................................... *B25J 9/1045* (2013.01)

(58) Field of Classification Search
CPC . B25J 9/104; B25J 9/1045; B25J 9/106; B25J 15/0233; B25J 9/042; B25J 9/0006; F16H 19/0618; F16H 2019/0695; F16H 19/0628; F16H 2019/0609; F16H 7/12; F16H 2019/0686; Y10S 901/01
USPC .................................. 74/479.01, 89.22, 89.2
See application file for complete search history.

(56) References Cited

U.S. PATENT DOCUMENTS 9,145,955 B2 * 9/2015 Ferlay ........................ F16H 9/04
9,512,912 B1 * 12/2016 Edsinger ................. F16H 48/12
10,330,182 B2 6/2019 Edsinger et al.
11,246,668 B1 * 2/2022 Mark ................... B25J 17/0275
2009/0308188 A1 12/2009 Yang et al.
2015/0167798 A1 * 6/2015 Gosselin .................. B25J 9/102 475/182
2017/0067547 A1 * 3/2017 Edsinger ................... F16H 7/02
2019/0030707 A1 1/2019 Chen et al.
2022/0152813 A1 5/2022 Kamon et al.
2024/0052923 A1 2/2024 Wang et al.

FOREIGN PATENT DOCUMENTS

WO 2022012713 A1 1/2022
WO 2023214837 A1 11/2023

OTHER PUBLICATIONS

Chignoli et al., "The MIT Humanoid Robot: Design, Motion Planning, and Control For Acrobatic Behaviors," 2020 IEEE—RAS 20th International Conference on Humanoid Robots, Jul. 19-21, 2021, 8 pages.

(Continued)

*Primary Examiner* — Victor L Macarthur
(74) *Attorney, Agent, or Firm* — Suiter Swantz IP

(57) ABSTRACT

Two oppositely wound differential windlass mechanisms may provide rotary motion to a robotic limb. The two differential windlasses may share a differential drum. Due to the different diameters as well as the opposing winding directions, a series of pulleys may be between the differential drum and hanging pulleys to align tension elements of the differential windlass mechanisms so that the tension elements act in parallel planes. A winding drum of a lower limb is pinned to hanging pulleys via additional tension elements. Translation of the hanging pulleys via the differential windlasses cause rotation of the lower limb via the winding drum.

20 Claims, 20 Drawing Sheets

100

(56) References Cited

OTHER PUBLICATIONS

Hubicki et al., “ATRIAS: Design and Validation of Tether-free 3D-capable Spring-Mass Bipedal Robot,” The International Journal of Robotics Research, 2016, 31 pages.
Saloutos et al., “Design and Development of the MIT Humanoid: A Dynamic and Robust Research Platform,” 2023 IEEE—RAS 22nd International Conference on Humanoid Robots, 2023, 8 pages.
Sim et al., “Tello Leg: The Study of Design Principles and Metrics for Dynamic Humanoid Robots,” IEEE Robotics and Automation Letters, vol. 7, No. 4, Oct. 2022, 8 pages.

* cited by examiner

100

100

SECTION B-B

DIFFERENTIAL WINDLASS ROBOTIC JOINT

TECHNICAL FIELD

The present disclosure generally relates to manipulators for converting rotary motion to oscillating motion, and more particularly, to differential gearings to provide the conversion.

BACKGROUND

Robotics applications call for high-ratio drives with minimum backlash to provide rotation. The current state of the art for robotics is to use either strainwave, cycloidal, or planetary drives to provide rotary motion for joints. However, the precision machining needed to make these components make drives expensive to produce. This is mainly due to the high ratios that can be obtained with low backlash. Therefore, it would be advantageous to provide a device, system, and method that cures the shortcomings described above.

SUMMARY

A robotic limb is described, in accordance with one or more embodiments of the present disclosure. The robotic limb may include: a first rigid member; a second rigid member, wherein the second rigid member includes a winding drum; a first differential windlass including: a differential drum, wherein the second rigid member and the differential drum are supported by and configured to rotate relative to the first rigid member; a first pair of idlers; a first tension element; and a first hanging pulley; a second differential windlass including: the differential drum; a second pair of idlers; a second tension element; and a second hanging pulley, wherein the first hanging pulley and the second hanging pulley are suspended from the differential drum by respective of the first tension element and the second tension element, wherein rotation of the differential drum causes the first hanging pulley and the second hanging pulley to translate in opposing directions via the first tension element and the second tension element; a third tension element; and a fourth tension element, wherein the first hanging pulley and the second hanging pulley are suspended from the winding drum by respective of the third tension element and the fourth tension element, wherein translation of the first hanging pulley and the second hanging pulley in opposing directions causes the second rigid member to rotate via the third tension element and the fourth tension element.

In some aspects, the second rigid member includes a linkage, wherein the linkage and the winding drum are affixed.

In some aspects, the robotic limb includes a motor, wherein the motor is supported by the first rigid member, wherein the motor is configured to cause the differential drum to rotate relative to the first rigid member.

In some aspects, the robotic limb includes a transmission, wherein the transmission couples the motor to the differential drum.

In some aspects, the robotic limb is configured to lock the second rigid member by disengaging the motor.

In some aspects, the first tension element is held in tension by the differential drum, the first pair of idlers, and the first hanging pulley, wherein the second tension element is held in tension by the differential drum, the second pair of idlers, and the second hanging pulley, wherein the third tension element is held in tension by the first hanging pulley and the winding drum, wherein the fourth tension element is held in tension by the second hanging pulley and the winding drum.

In some aspects, the first pair of idlers and the second pair of idlers are mounted to and configured to rotate relative to the first rigid member.

In some aspects, the first hanging pulley and the second hanging pulley each include a pulley end and an attachment end, wherein the pulley end is configured to rotate relative to the attachment end, wherein a bight of the first tension element and a bight of the second tension element are looped around respective of the pulley end of the first hanging pulley and the pulley end of the second hanging pulley, wherein the third tension element is affixed to the attachment end of the first hanging pulley, wherein the fourth tension element is affixed to the attachment end of the second hanging pulley.

In some aspects, the bight of the first tension element and the bight of the second tension element are aligned in parallel planes by the first pair of idlers and the second pair of idlers.

In some aspects, the differential drum includes one or more first diameter sections and one or more second diameter sections, wherein the one or more first diameter sections and the one or more second diameter sections are coaxial, wherein opposing ends of the first tension element and opposing ends of the second tension element are wound over and affixed to the one or more first diameter sections and the one or more second diameter sections.

In some aspects, center axes of the differential drum, the first pair of idlers, and the second pair of idlers are aligned perpendicular to center axes of the first hanging pulley, the second hanging pulley, and the winding drum.

In some aspects, the first pair of idlers and the second pair of idlers are coaxial, wherein the first pair of idlers are smaller in diameter than the second pair of idlers.

In some aspects, the differential drum includes two of the one or more the first diameter sections and one of one or more second diameter sections, wherein the one of one or more second diameter sections are axially disposed between the two of the one or more the first diameter sections.

In some aspects, center axes of the differential drum, the first pair of idlers, the second pair of idlers, and the winding drum are aligned perpendicular to center axes of the first hanging pulley and the second hanging pulley.

In some aspects the center axes of the first pair of idlers and the second pair of idlers are offset, wherein the differential drum is disposed between the first pair of idlers and the second pair of idlers.

In some aspects, the differential drum include one of one or more first diameter sections and one of the one or more second diameter sections.

In some aspects, opposing ends of the third tension element and opposing ends of the fourth tension element are affixed to the winding drum and respective of the first hanging pulley and the second hanging pulley.

In some aspects, the third tension element and the fourth tension element are radially aligned and axially offset on the winding drum, wherein the third tension element and the fourth tension element are looped over the winding drum in opposing directions.

A robot is described, in accordance with one or more embodiments of the present disclosure. The robot may include: a plurality of robotic limbs, wherein the plurality of robotic limbs include: a first rigid member; a second rigid member, wherein the second rigid member includes a winding drum; a first differential windlass including: a differential drum, wherein the second rigid member and the differential drum are supported by and configured to rotate relative to the first rigid member; a first pair of idlers; a first tension element; and a first hanging pulley; a second differential windlass including: the differential drum; a second pair of idlers; a second tension element; and a second hanging pulley, wherein the first hanging pulley and the second hanging pulley are suspended from the differential drum by respective of the first tension element and the second tension element, wherein rotation of the differential drum causes the first hanging pulley and the second hanging pulley to translate in opposing directions via the first tension element and the second tension element; a third tension element; and a fourth tension element, wherein the first hanging pulley and the second hanging pulley are suspended from the winding drum by respective of the third tension element and the fourth tension element, wherein translation of the first hanging pulley and the second hanging pulley in opposing directions causes the second rigid member to rotate via the third tension element and the fourth tension element.

In some aspects, the techniques described herein relate to a robot, wherein the robot is a humanoid robot which is bipedal.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the description and drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
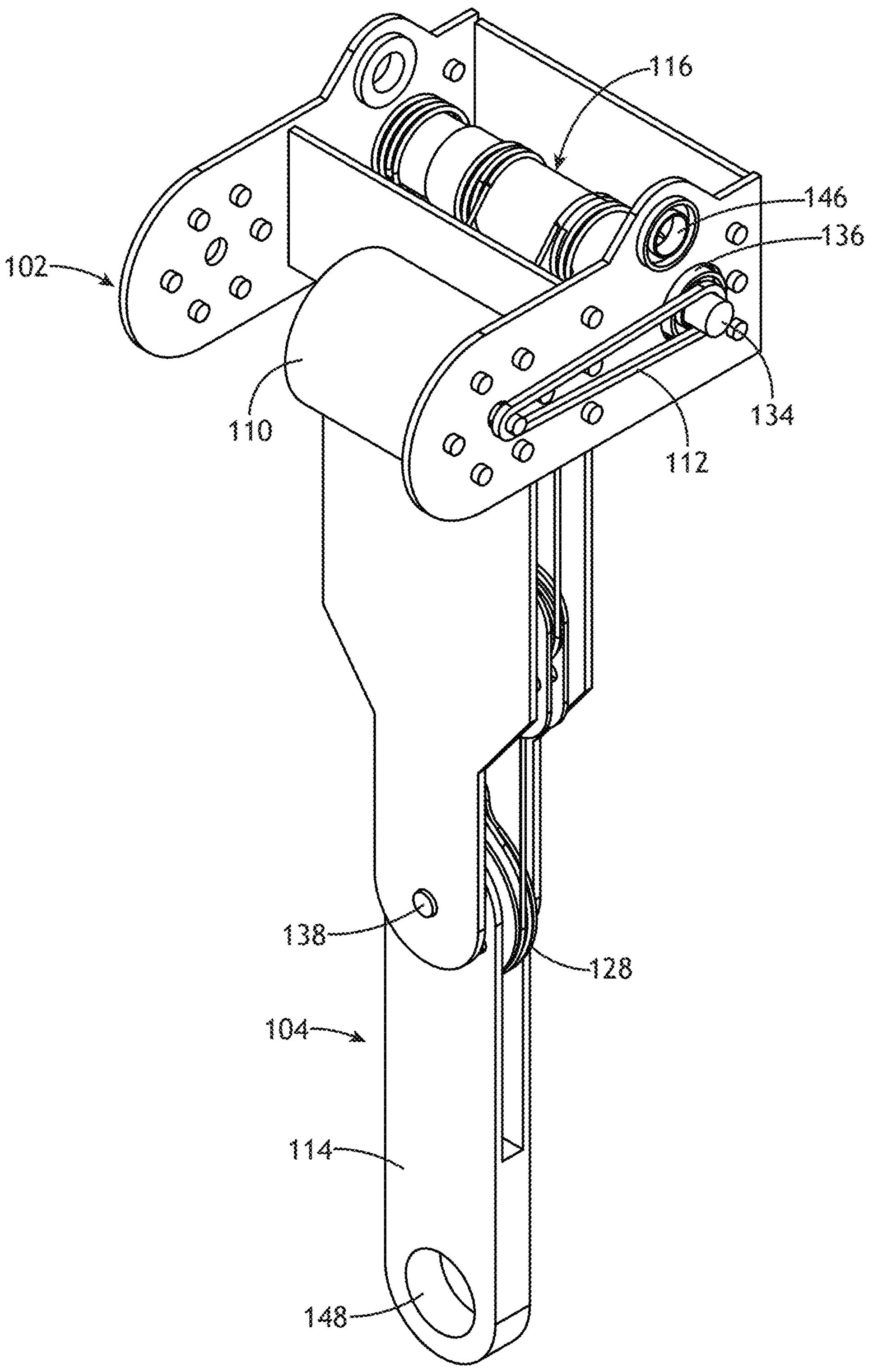
FIG. 1A depicts a perspective view of a robotic limb, in accordance with one or more embodiments of the present disclosure.
Figure 1B:
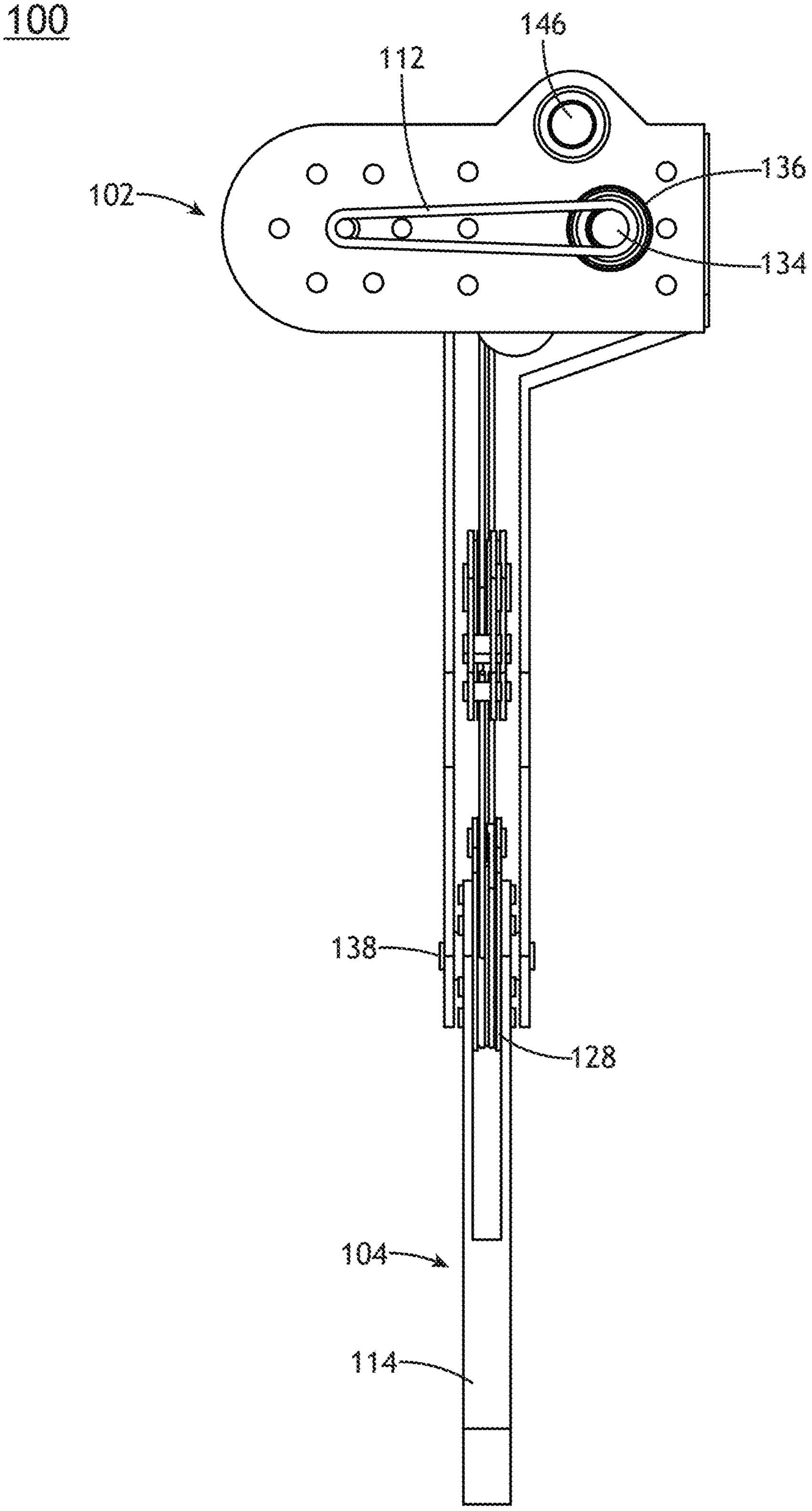
FIG. 1B depicts a side view of the robotic limb, in accordance with one or more embodiments of the present disclosure.
Figure 1C:
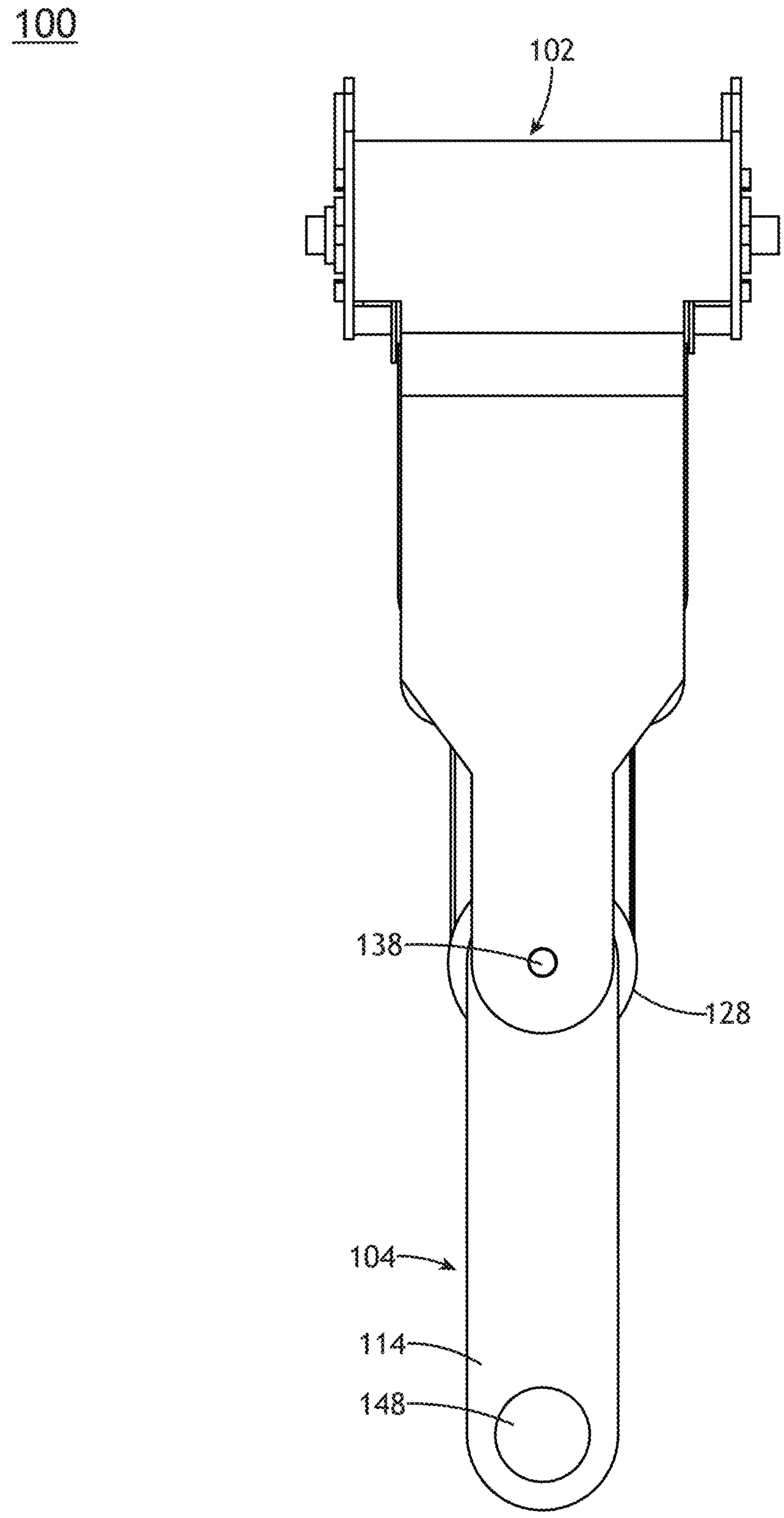
FIG. 1C depicts a rear view of the robotic limb, in accordance with one or more embodiments of the present disclosure.
Figure 1D:
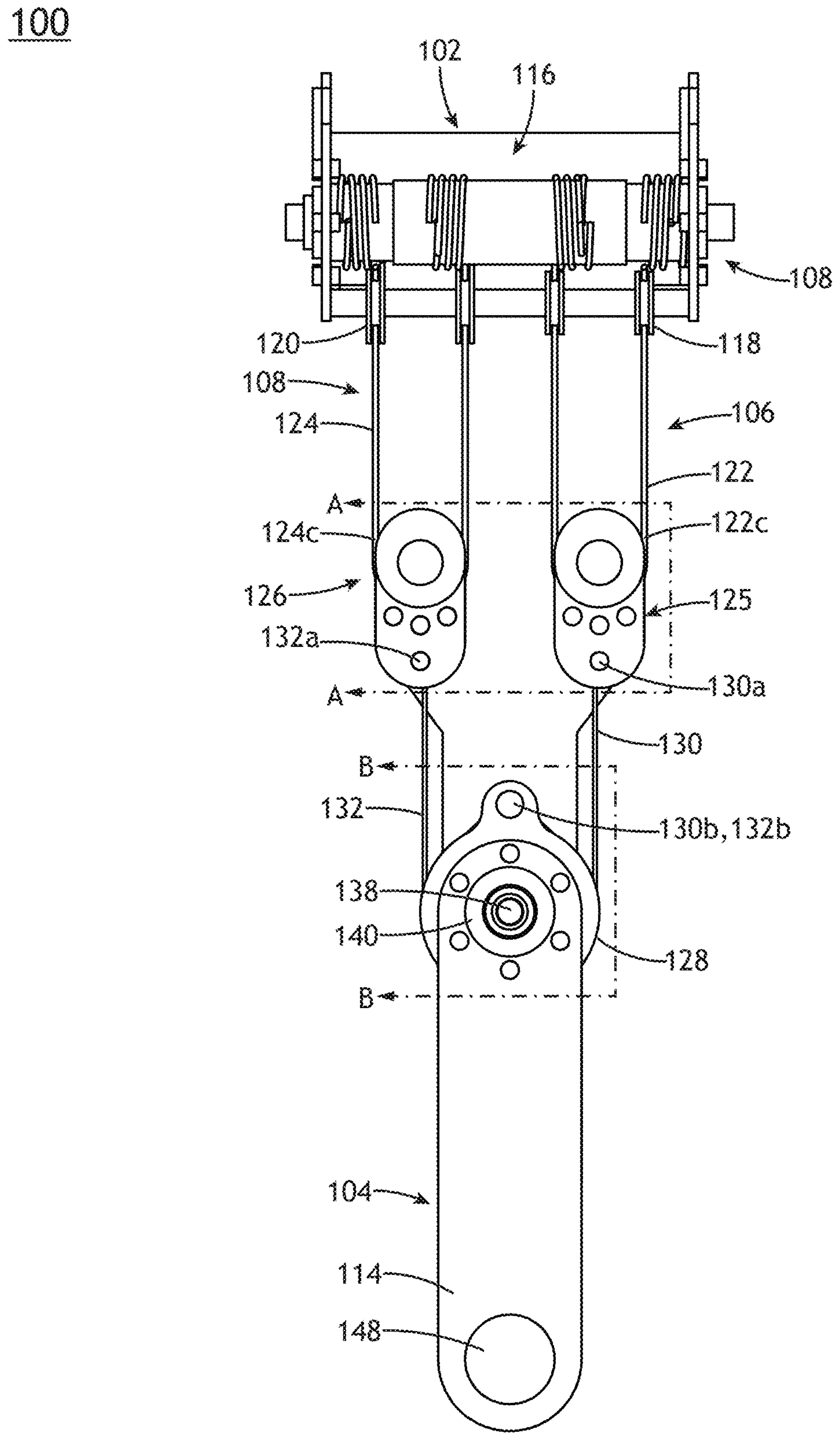
FIG. 1D depicts the rear view of the robotic limb with a portion of a rigid member hidden, in accordance with one or more embodiments of the present disclosure.
Figure 1E:
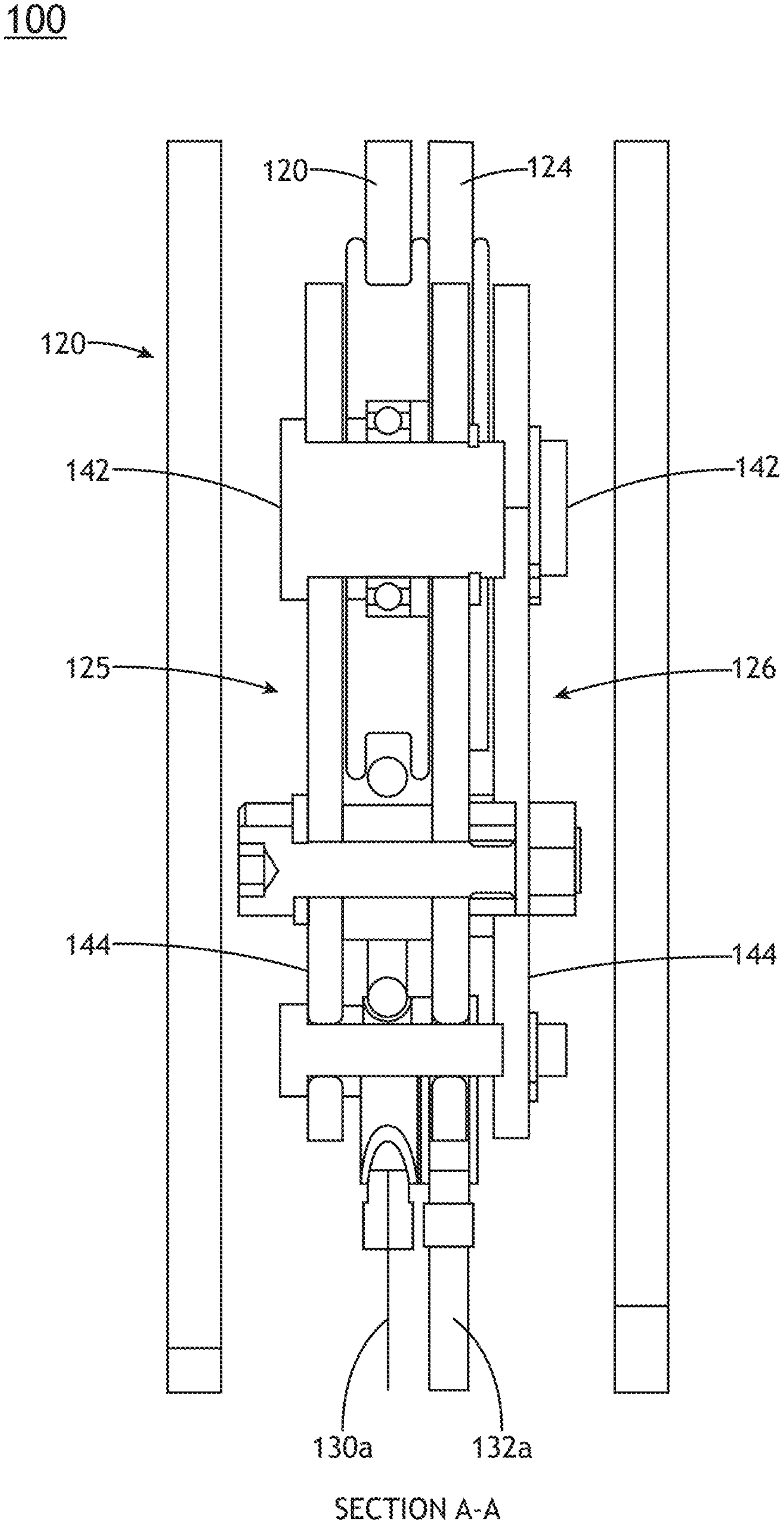
FIG. 1E depicts a section view of the robotic limb, in accordance with one or more embodiments of the present disclosure.
Figure 1F:
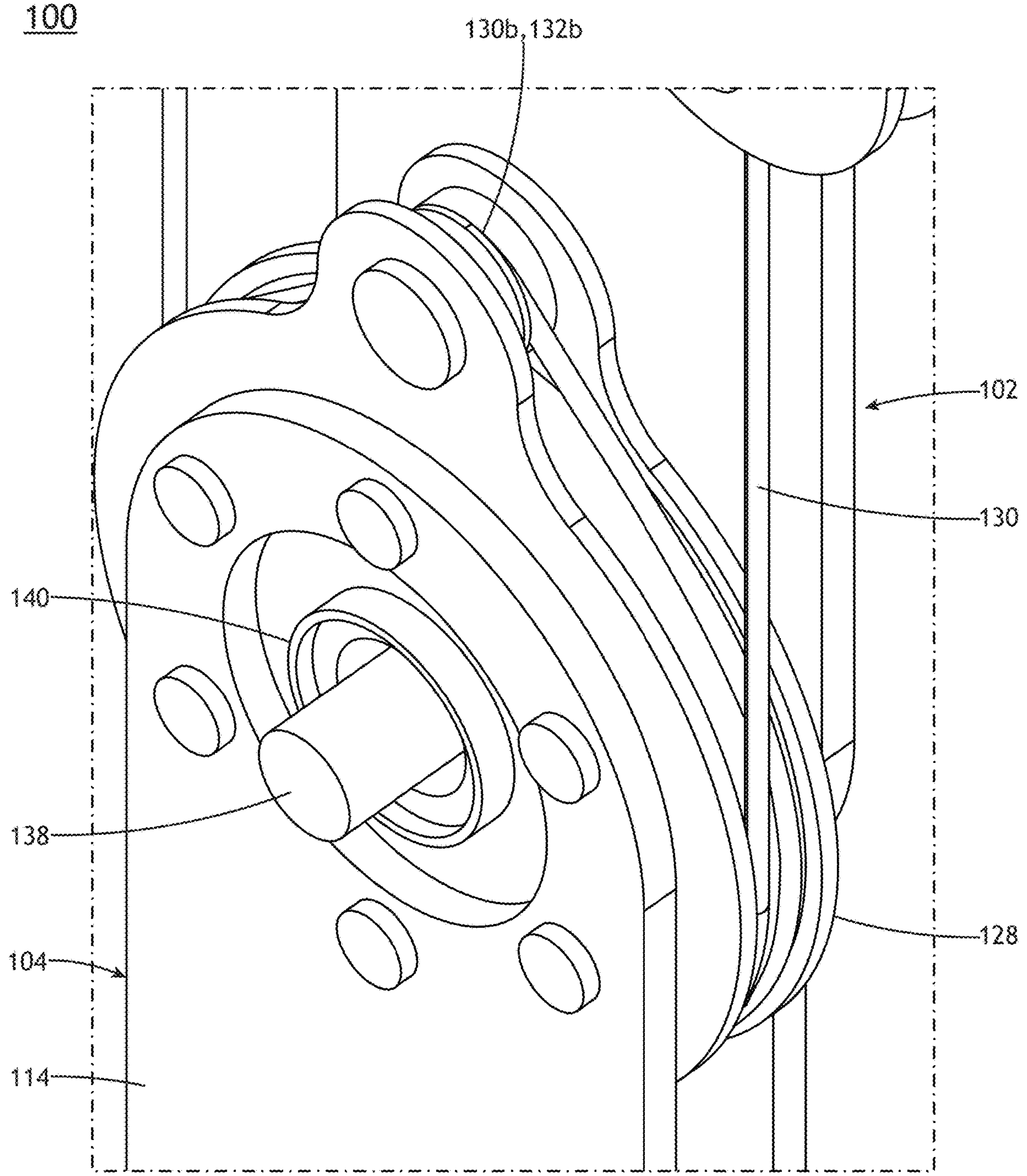
FIG. 1F depicts a partial perspective view of the robotic limb, in accordance with one or more embodiments of the present disclosure.
Figure 1G:
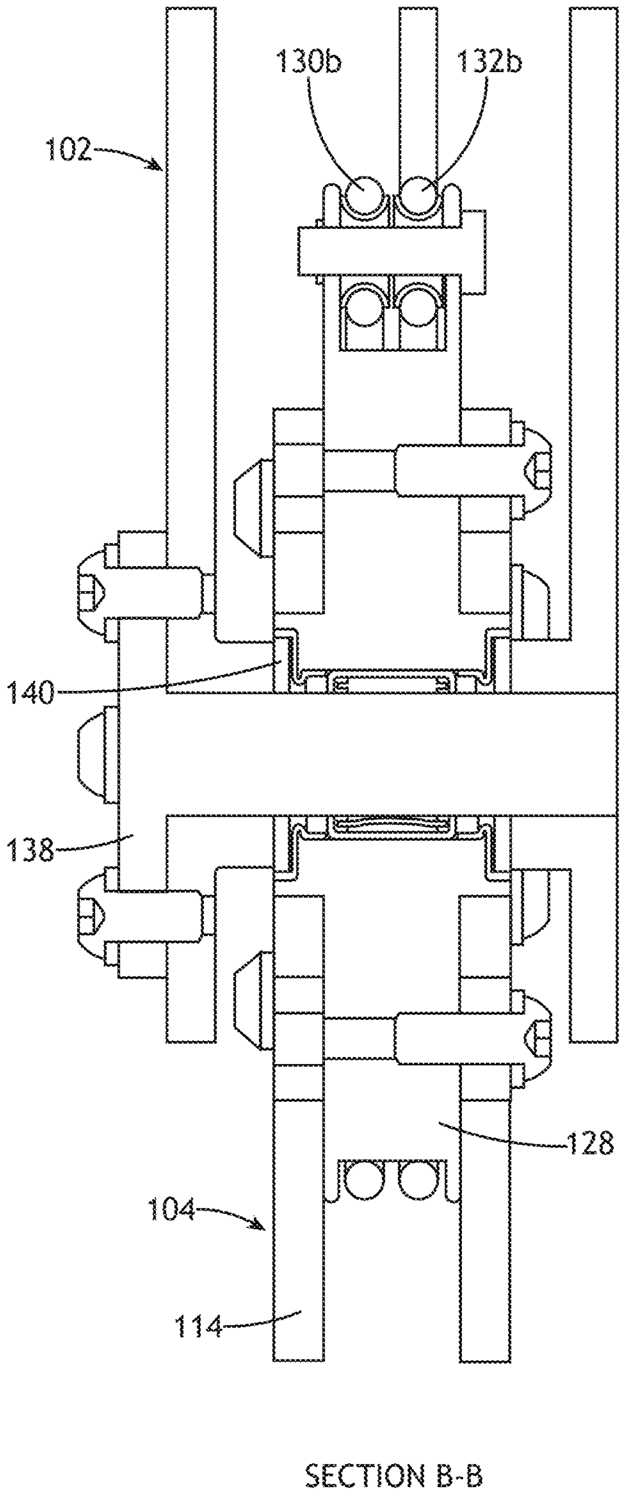
FIG. 1G depicts a section view of the robotic limb, in accordance with one or more embodiments of the present disclosure.
Figure 1H:
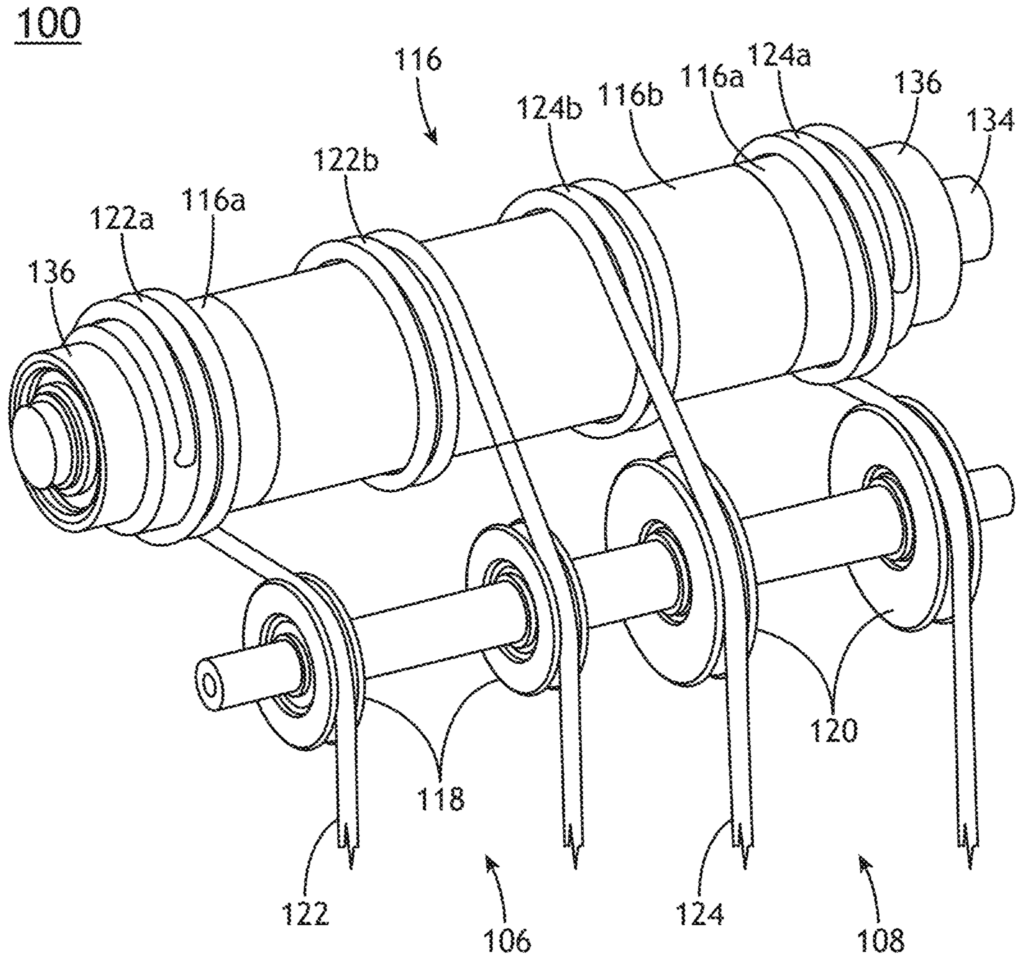
FIG. 1H depicts a partial perspective view of the robotic limb, in accordance with one or more embodiments of the present disclosure.
Figure 1I:
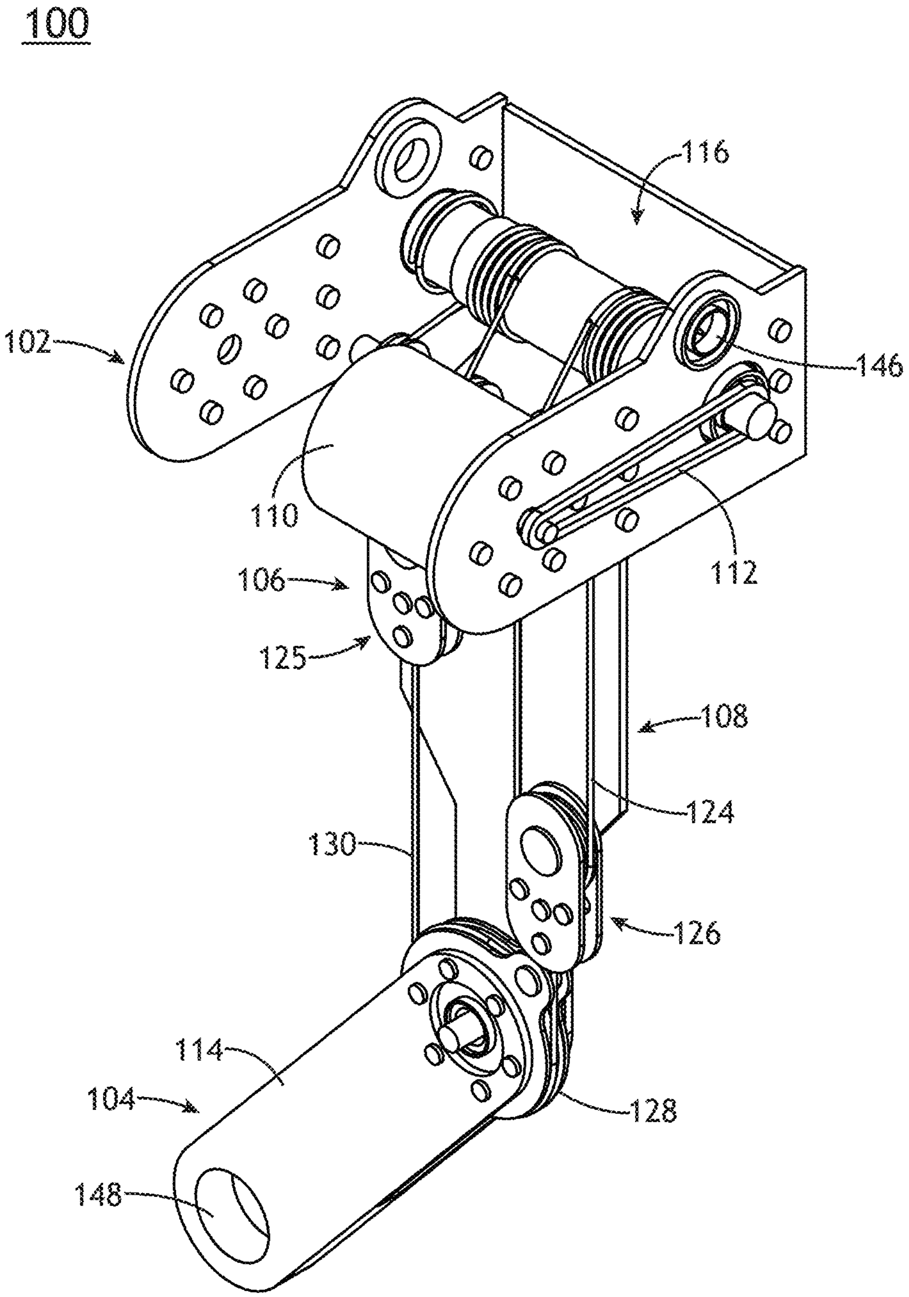
FIGS. 1I-1K depict perspective views of the robotic limb with a portion of a rigid member hidden to show the action of the differential windlasses, in accordance with one or more embodiments of the present disclosure.
Figure 1J:
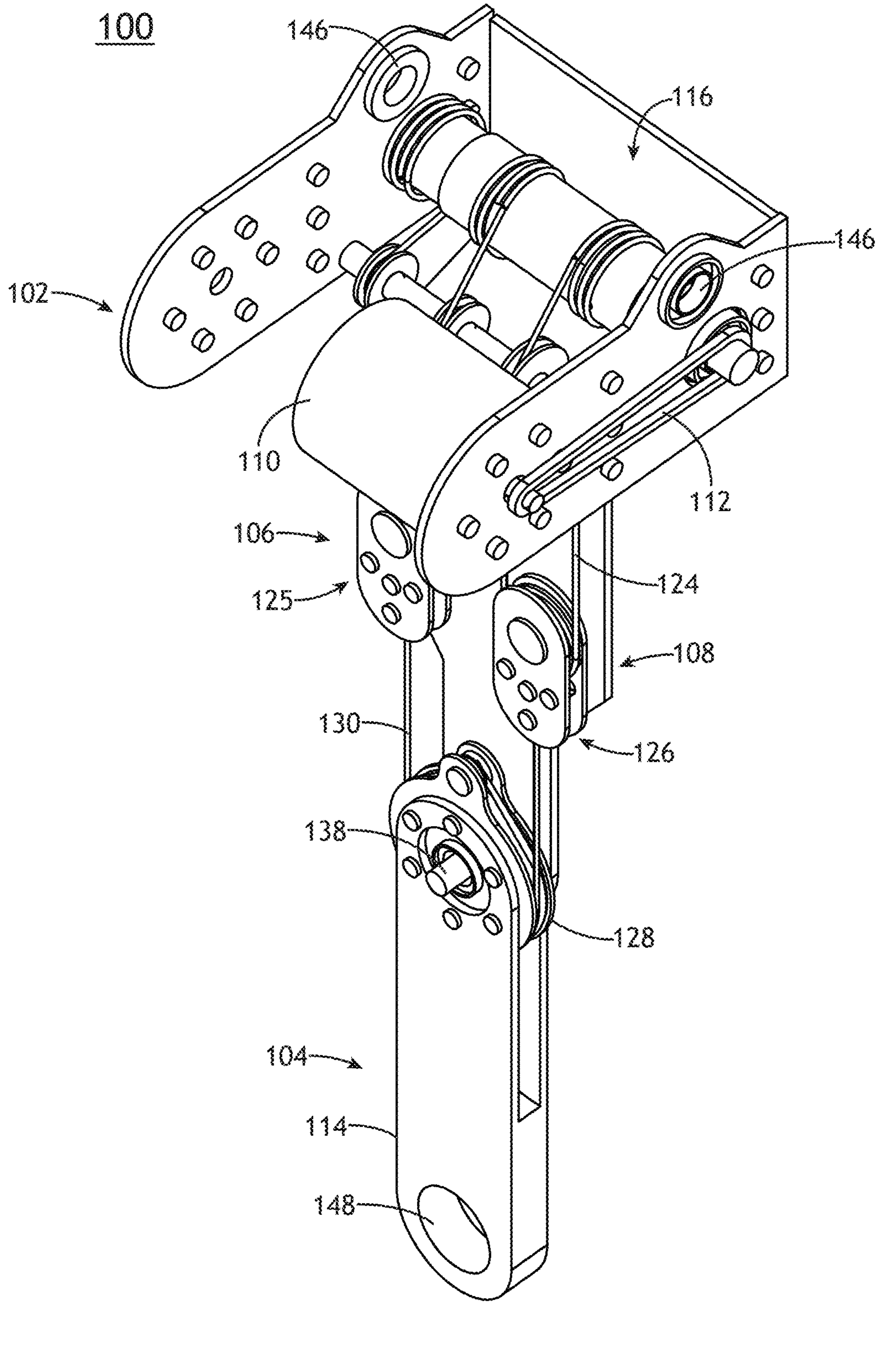
Figure 1K:
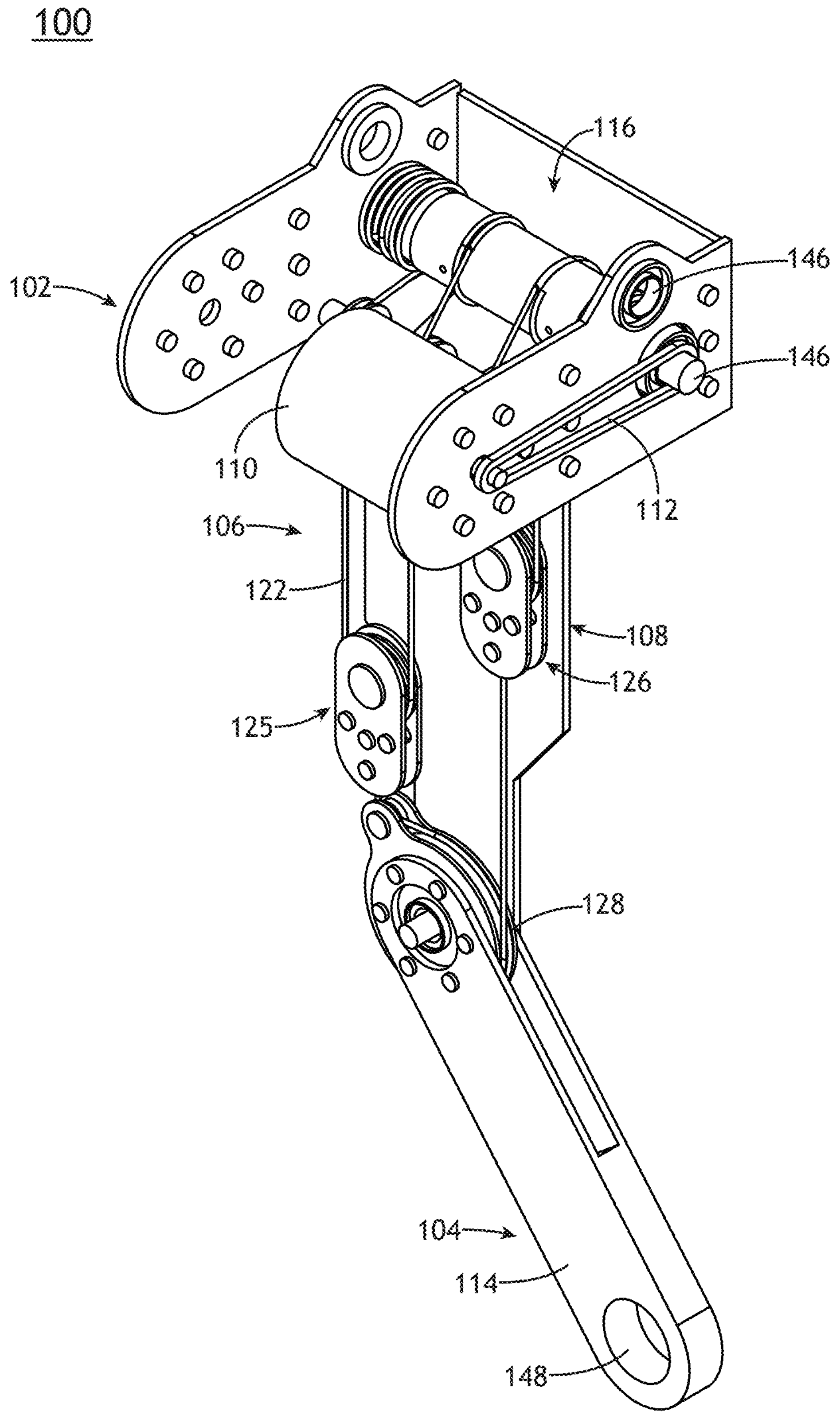
Figure 2A:
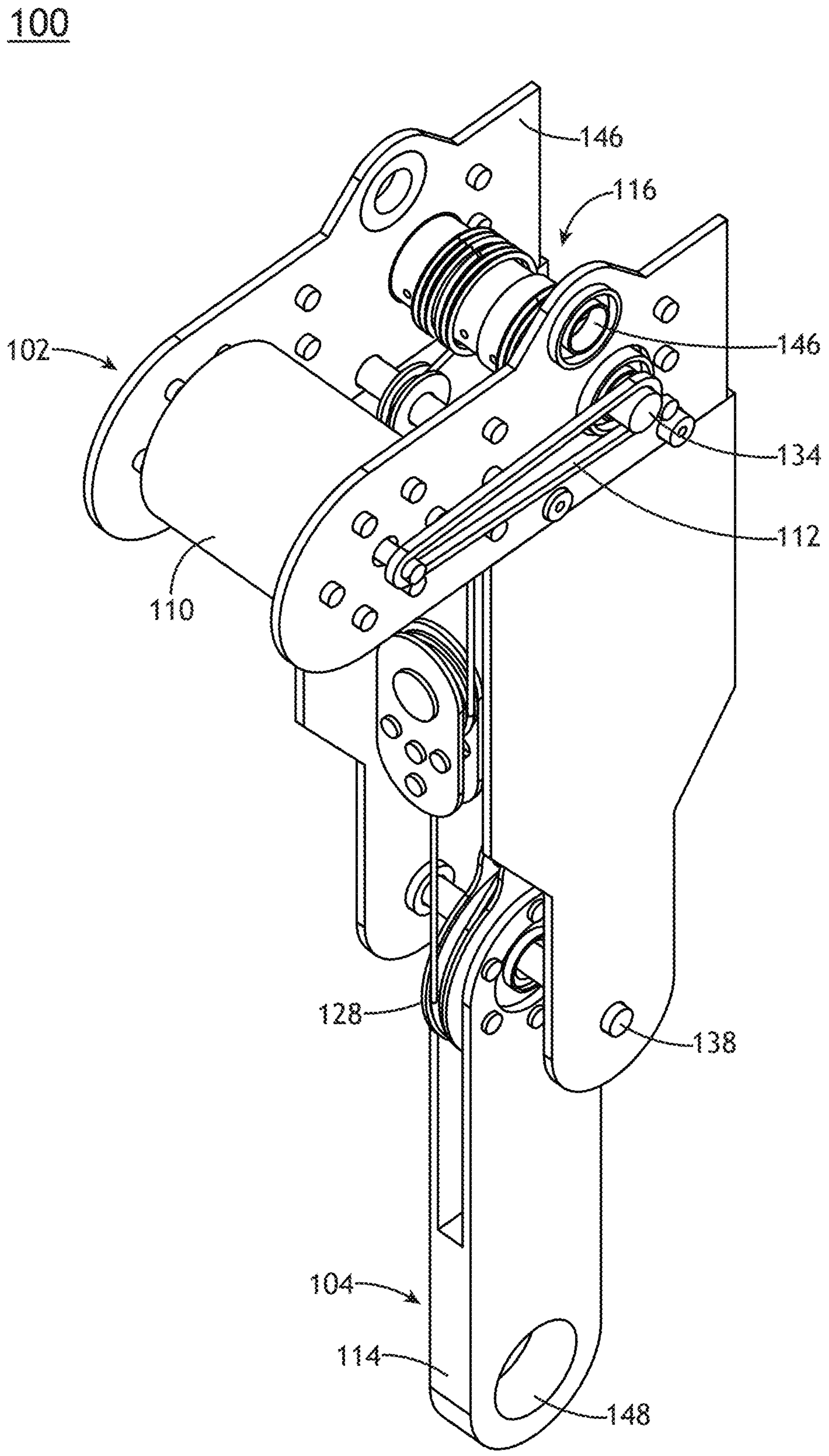
FIG. 2A depicts a perspective view of the robotic limb, in accordance with one or more embodiments of the present disclosure.
Figure 2B:
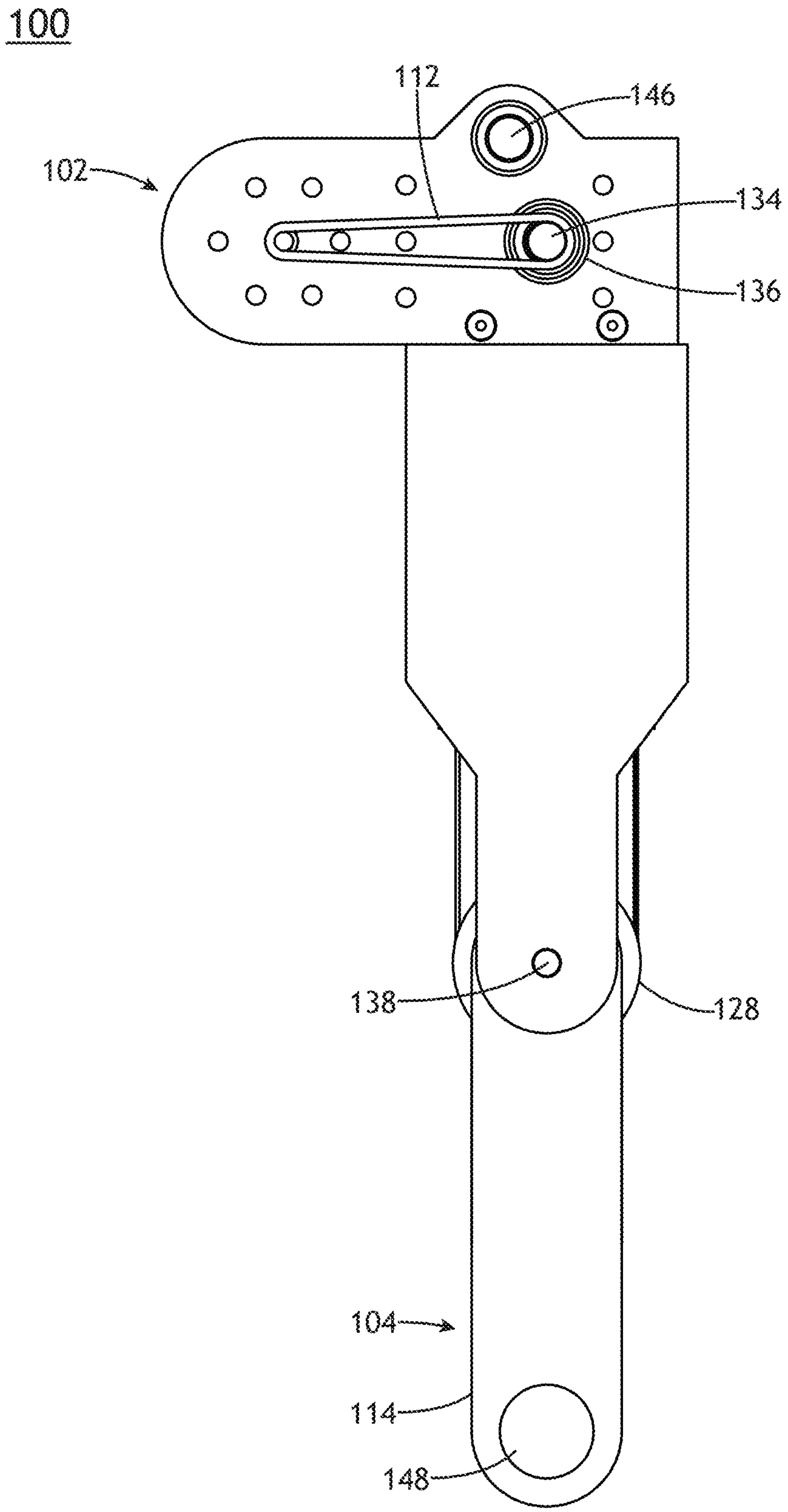
FIG. 2B depicts a side view of the robotic limb, in accordance with one or more embodiments of the present disclosure.
Figure 2C:
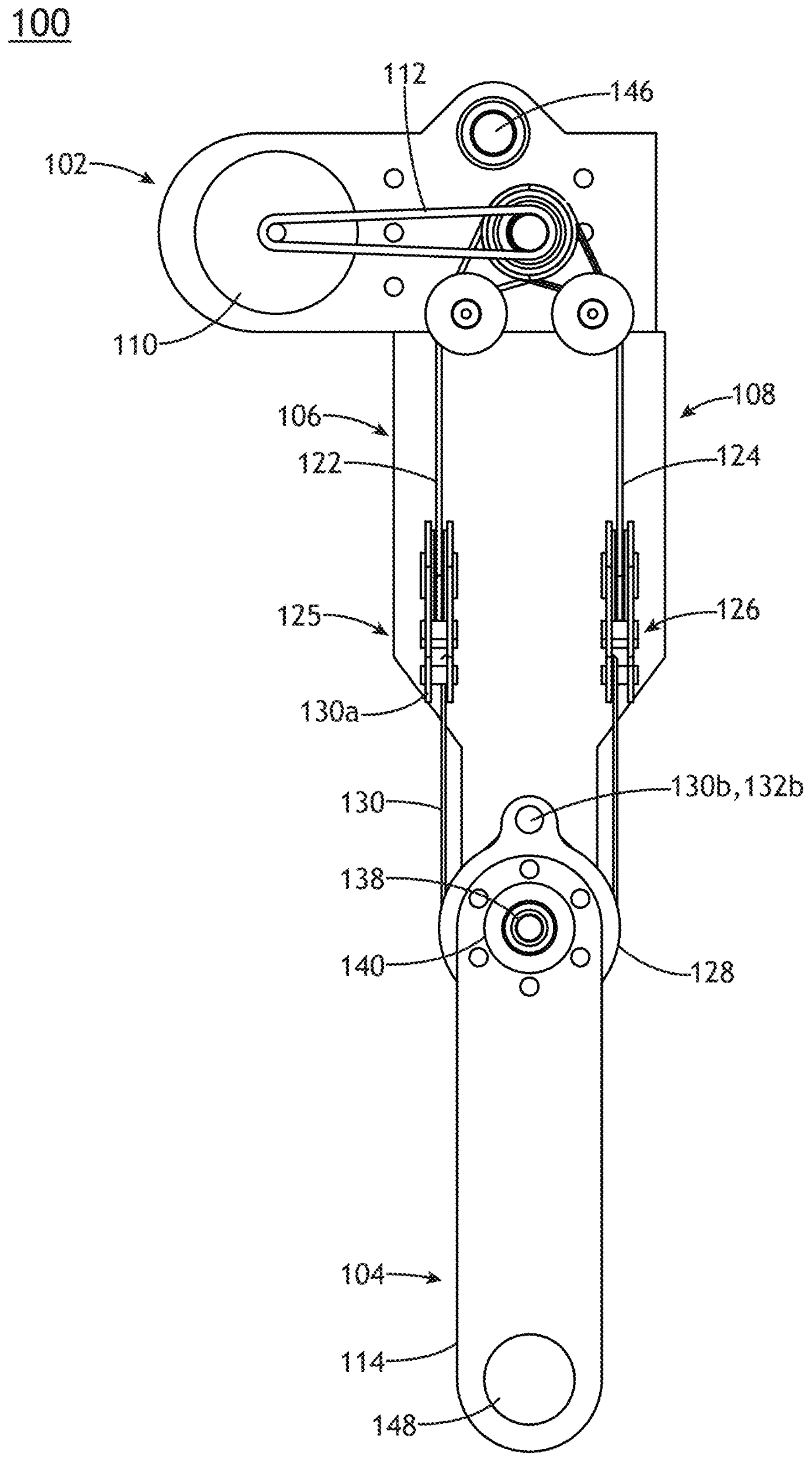
FIG. 2C depicts a side view of the robotic limb with a portion of a rigid member hidden, in accordance with one or more embodiments of the present disclosure.
Figure 2D:
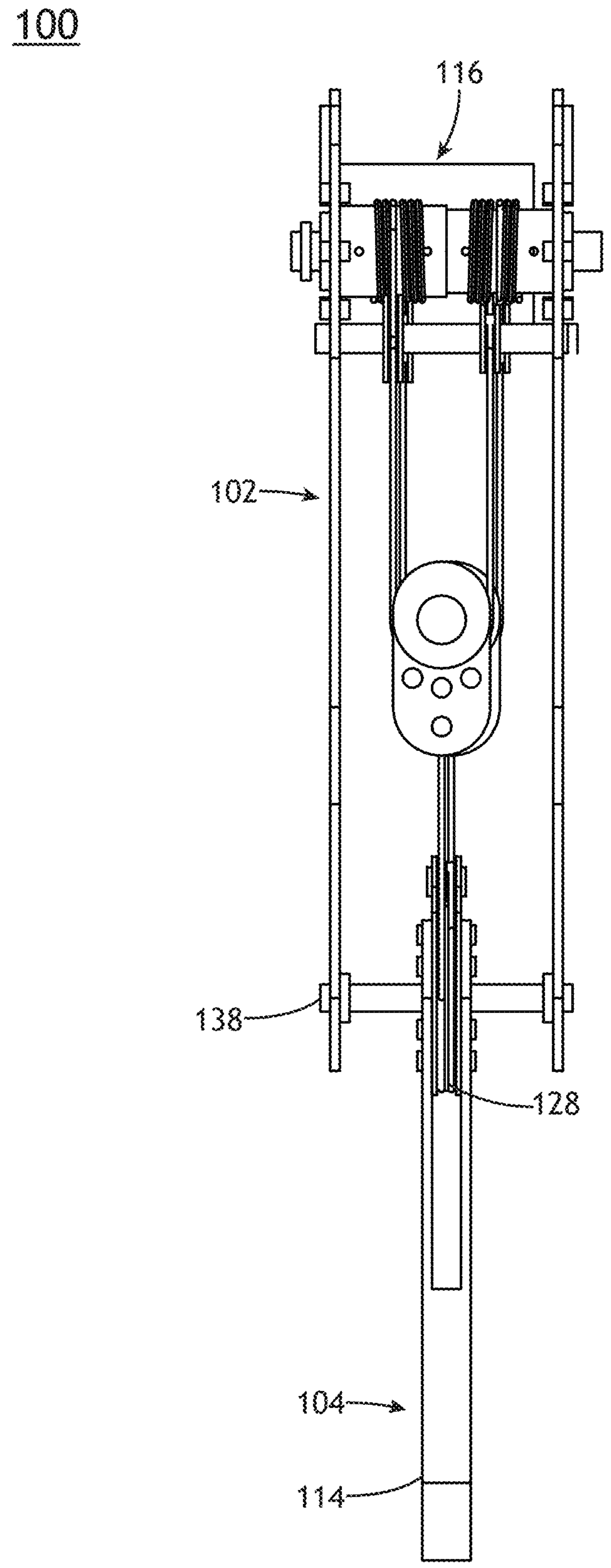
FIG. 2D depicts a rear view of the robotic limb, in accordance with one or more embodiments of the present disclosure.
Figure 2E:
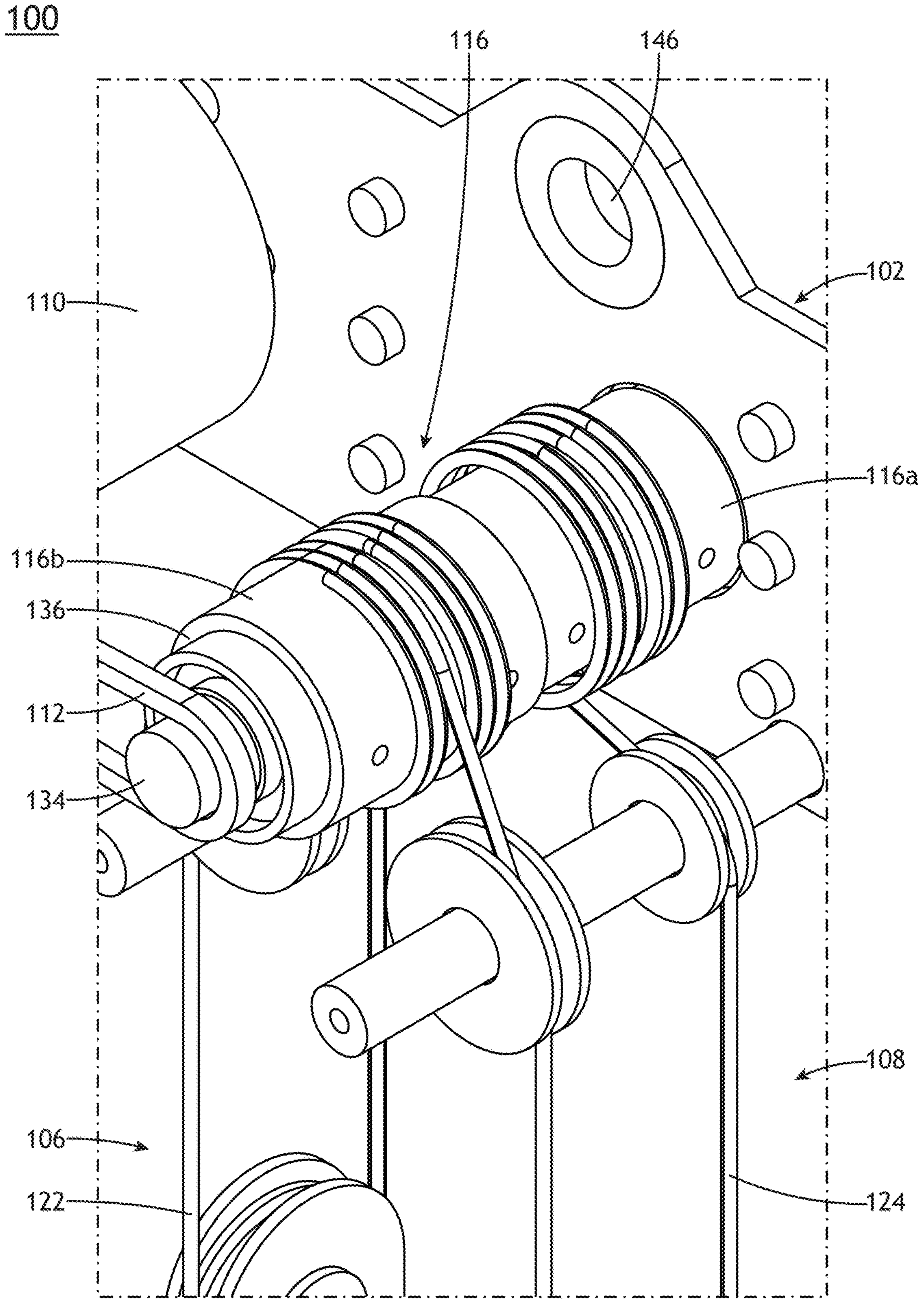
FIG. 2E depicts a partial perspective view of the robotic limb, in accordance with one or more embodiments of the present disclosure.
Figure 2F:
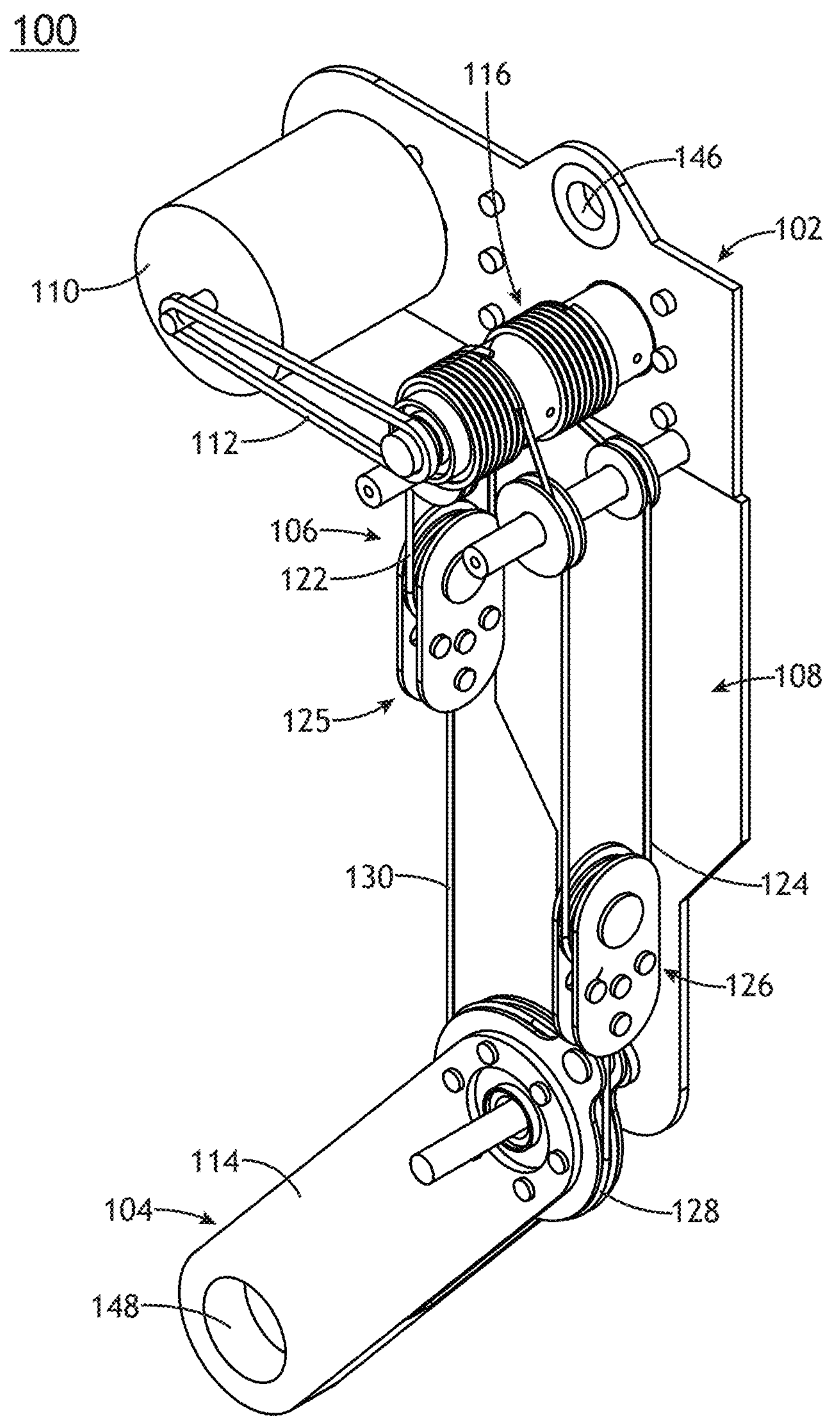
FIGS. 2F-2H depicts a perspective view of the robotic limb with a portion of a rigid member hidden to show the action of the differential windlasses, in accordance with one or more embodiments of the present disclosure.
Figure 2G:
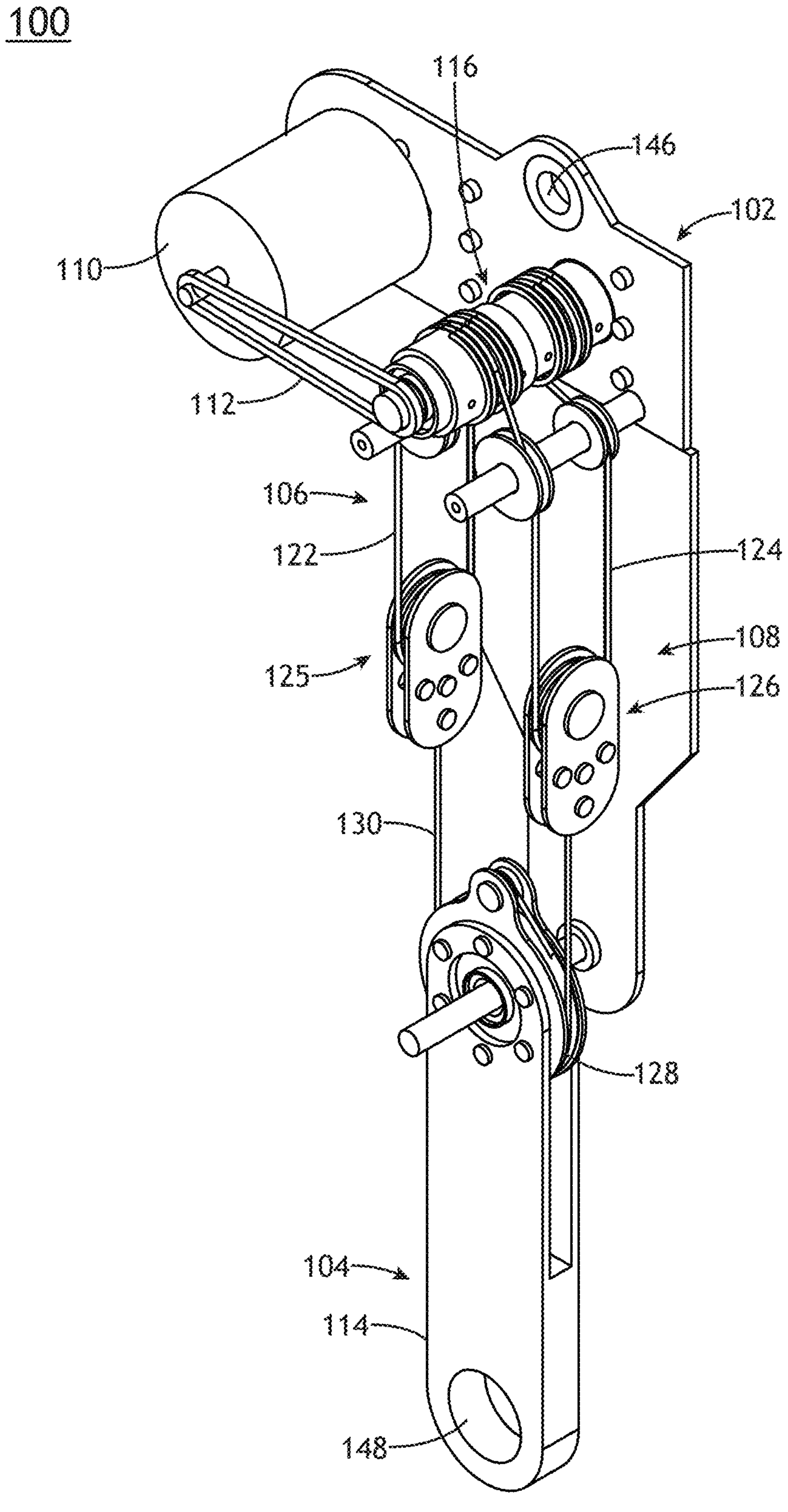
Figure 2H:
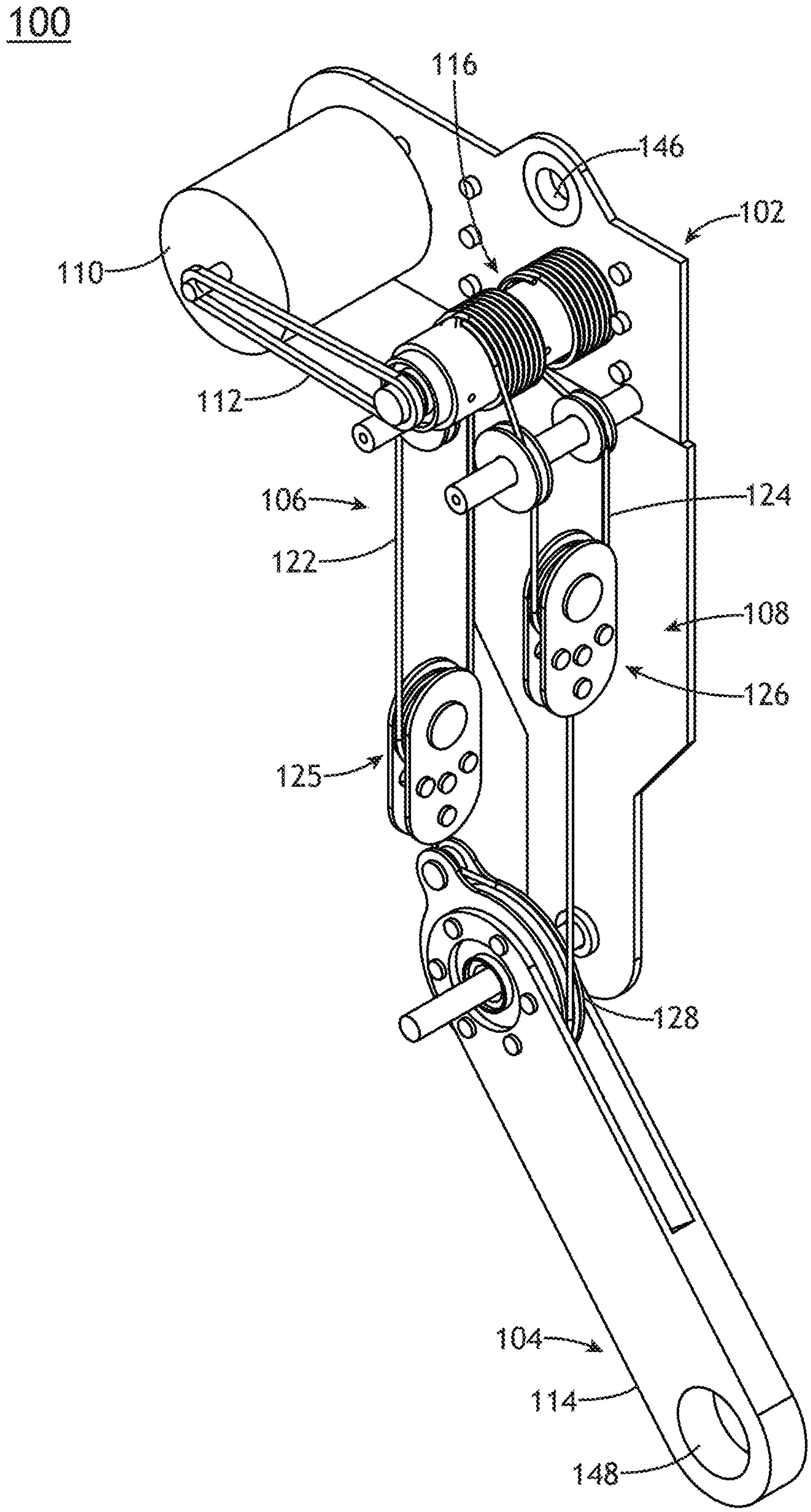

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to a differential windlass robotic joint. Two oppositely wound differential windlass mechanisms may provide rotary motion to a robotic limb. The two differential windlasses may share a differential drum. Due to the different diameters as well as the opposing winding directions, a series of pulleys may be between the differential drum and hanging pulleys to align tension elements of the differential windlass mechanisms so that the tension elements act in parallel planes. A winding drum of a lower limb is pinned to hanging pulleys via additional tension elements. Translation of the hanging pulleys via the differential windlasses cause rotation of the lower limb via the winding drum.

FIGS. 1A-1K depict a robotic limb 100, in accordance with one or more embodiments of the present disclosure. The robotic limb 100 may be an upper limb and/or a lower limb. The robotic limb 100 may be used in various applications, such as, but not limited to, a humanoid knee joint, a humanoid elbow joint, or the like.

The robotic limb 100 may include one or more components, such as, but not limited to, a first rigid member 102, a second rigid member 104, a first differential windlass 106, a second differential windlass 108, a motor 110, a transmission 112, a linkage 114, a differential drum 116, a first pair of idlers 118, a second pair of idlers 120, a first tension element 122, a second tension element 124, a first hanging pulley 125, a second hanging pulley 126, a winding drum 128, a third tension element 130, and/or a fourth tension element 132.

The first rigid member 102 may also be referred to as a housing, a thigh, and/or an upper arm. The first rigid member 102 may be coupled to bearings 146. The bearings 146 may provide a connection to a hip joint, a shoulder joint, or the like. The first rigid member 102 may support the first differential windlass 106, the first pair of idlers 118, a second pair of idlers 120, and/or the motor 110. The heaviest components of the robotic limb 100 may be placed near the bearings 146, decreasing the effect of inertia during movement of the robotic limb 100.

The differential drum 116 may be supported by and configured to rotate relative to the first rigid member 102. For example, the differential drum 116 may be coupled with the first rigid member 102 by a revolute joint by which the differential drum 116 may be supported by and configured to rotate relative to the first rigid member 102. For instance, a drive shaft 134 of the differential drum 116 may form the revolute joint with the first rigid member 102 via bearings 136. As depicted, the drive shaft 134 of the differential drum 116 may form the revolute joint with the first rigid member 102 via a pair of the bearings 136 disposed at opposing ends of the drive shaft 134. The drive shaft 134 may drive the rotation of the differential drum 116.

The motor 110 may be supported by the first rigid member 102. For example, a stator of the motor 110 may be coupled to the first rigid member 102 and a rotor of the motor 110 may be coupled to the differential drum 116. The motor 110 may cause the differential drum 116 to rotate relative to the first rigid member 102. For example, the motor 110 may cause the differential drum 116 to rotate in both a clockwise direction and a counterclockwise direction. The motor 110 may include any suitable motor, such as, but not limited to, an electric motor.

The transmission 112 may to transfer mechanical power from the motor 110 to the differential drum 116. The transmission 112 may couple the motor 110 to the differential drum 116. The transmission 112 may include any suitable transmission, such as, but not limited to, a direct drive, a belt drive, a gear drive, or the like. As depicted, the transmission 112 is the belt drive, although this is not intended to be limiting. The transmission 112 may provide a gear-ratio between the motor 110 and the differential drum 116. For example, the gear-ratio may be based on the diameters of the drive shaft 134 of the differential drum 116 and the rotor of the motor 110, where the transmission 112 is the belt drive. Thus, the differential drum 116 may be driven by the motor 110 with a belt connection, further adding to the possible ratio.

The first differential windlass 106 and the second differential windlass 108 may also be referred to as Chinese windlasses. The first differential windlass 106 may include the differential drum 116, the first pair of idlers 118, the first tension element 122, and/or the first hanging pulley 125. Similarly, the second differential windlass 108 may include the differential drum 116, the second pair of idlers 120, the second tension element 124, and/or the second hanging pulley 126. The first differential windlass 106 and the second differential windlass 108 may share the differential drum 116.

The differential drum 116 may include first diameter sections **116*a* and second diameter sections 116*b*. The first diameter sections 116*a* and the second diameter sections 116*b* may be coaxial, such that each of the first diameter sections 116*a* and the second diameter sections 116*b* rotate with a same angular velocity. The first diameter sections 116*a* may be smaller in diameter than the second diameter sections 116*b*. The differential drum 116 may be considered a differential by the first diameter sections 116*a* being smaller than the second diameter sections 116*b***.

The first tension element 122, the second tension element 124, the third tension element 130, and the fourth tension element 132 may bear tension without bearing any significant amount of compression. The tension elements may include any suitable tension elements, such as, but not limited to, a cable (e.g., a steel cable), a rope, a chain, a belt, or the like.

The first tension element 122 and the second tension element 124 may be held in tension. The first tension element 122 may be held in tension by the differential drum 116, the first pair of idlers 118, and the first hanging pulley 125. Similarly, the second tension element 124 may be held in tension by the differential drum 116, the second pair of idlers 120, and the second hanging pulley 126. The first tension element 122 and the second tension element 124 may be non-endless tension elements. The first tension element 122 and the second tension element 124 may include first ends and second ends. For example, the first tension element 122 may include a first end **122*a* and a second end 122*b*. By way of another example, the second tension element 124 may include a first end 124*a* and a second end 124*b***.

Opposing ends of the first tension element 122 and opposing ends of the second tension element 124 may be wound over and affixed to the first diameter sections **116*a* and second diameter sections 116*b*. For example, the first end 122*a* of the first tension element 122 and the first end 124*a* of the second tension element 124 may be wound over and affixed to the first diameter sections 116*a*. By way of another example, the second end 122*b* of the first tension element 122 and the second end 124*b* of the second tension element 124 may be wound over and affixed to the second diameter sections 116*b*. The first tension element 122 and the second tension element 124 may be wound over the first diameter sections 116*a* and second diameter sections 116*b* with a select number of windings. The number of windings may be related to the travel of the mechanism. The number of windings may change as the first tension element 122 and the second tension element 124 are wound and unwound from the differential drum 116. The first tension element 122 and the second tension element 124 may be affixed to the first diameter sections 116*a* and second diameter sections 116*b* by threading the ends into radial holes (e.g., radial through holes) defined by the differential drum 116**.

The opposing ends of the first tension element 122 and the opposing ends of the second tension element 124 may be wound in opposing directions. For example, the first end **122*a* of the first tension element 122 may be wound over the first diameter sections 116*a* in a direction opposed to which the second end 122*b* of the first tension element 122 is wound over the second diameter sections 116*b*. By way of another example, the first end 124*a* of the second tension element 124 may be wound over the first diameter sections 116*a* in a direction opposed to which the second end 124*b* of the second tension element 124 is wound over the second diameter sections 116*b*. For instance, the first end 122*a* of the first tension element 122 and the first end 124*a* of the second tension element 124 may be wound starting below the first diameter sections 116*a* while the second end 122*b*** of the first tension element 122 and the second end 124*b* of the second tension element 124 may be wound starting above the second diameter sections 116*b*.

The first hanging pulley 125 and the second hanging pulley 126 may also be referred to as intermediate pulleys and/or movable pulleys. The first hanging pulley 125 and the second hanging pulley 126 may be suspended and configured to translate relative to each other, the first rigid member 102, and/or the second rigid member 104. The first hanging pulley 125 may be suspended from the differential drum 116 by the first tension element 122 and from the winding drum 128 by the third tension element 130. The second hanging pulley 126 may be suspended from the differential drum 116 by the second tension element 124 and from the winding drum 128 by the fourth tension element 132. The first hanging pulley 125 and the second hanging pulley 126 may be suspended from the differential drum 116 by respective of the first tension element 122 and the second tension element 124, and may be suspended from the winding drum 128 by respective of the third tension element 130 and the fourth tension element 132. Thus, both the first hanging pulley 125 and the second hanging pulley 126 are suspended by opposing tension forces from the differential drum 116 and from the winding drum 128. The opposing tension forces allows the first differential windlass 106 and the second differential windlass 108 to be operated in any orientation.

The first hanging pulley 125 may be supported by the first end 122*a* and the second end 122*b* of the first tension element 122. Similarly, the second hanging pulley 126 may be supported by the first end 124*a* and the second end 124*b* of the second tension element 124. For example, the first hanging pulley 125 and the second hanging pulley 126 may be hanging in a bight 122*c* of the first tension element 122 and the bight 124*c* of the second tension element 124, respectively. The bight 122*c* and the bight 124*c* may refer to the U-shaped curve of the first tension element 122 and the second tension element 124, respectively. The bights may be disposed between the opposing ends of the tension elements.

The first hanging pulley 125 and the second hanging pulley 126 may be any suitable type of hanging pulley. The first hanging pulley 125 and the second hanging pulley 126 may include pulley ends 142 and attachment ends 144. The pulley ends 142 may be configured to rotate relative to the attachment ends 144. The pulley ends 142 and the attachment ends 144 may be oriented towards the differential drum 116 and the winding drum 128, respectively. The pulley ends 142 may be disposed between the differential drum 116 and the attachment ends 144. The attachment ends 144 may be disposed between the pulley ends 142 and the winding drum 128. The bight 122*c* of the first tension element 122 and the bight 124*c* of the second tension element 124 may loop around the pulley ends 142 of the first hanging pulley 125 and the second hanging pulley 126, respectively.

The first pair of idlers 118 and the second pair of idlers 120 may be fixed pulleys. The first pair of idlers 118 and the second pair of idlers 120 may include an axle which is mounted to and configured to rotate relative to the first rigid member 102. The first rigid member 102 may support the first pair of idlers 118 and the second pair of idlers 120. The first pair of idlers 118 and the second pair of idlers 120 may alter a path of the first tension element 122 and the second tension element 124, respectively. The first pair of idlers 118 may align the first end 122*a* and the second end 122*b* of the first tension element 122 over the differential drum 116 and align the bight 122*c* of the first tension element 122 around the first hanging pulley 125. Similarly, the second pair of idlers 120 may align the first end 124*a* and the second end 124*b* of the second tension element 124 over the differential drum 116 and align the bight 124*c* of the second tension element 124 around the second hanging pulley 126. The first pair of idlers 118 and the second pair of idlers 120 may press against the first tension element 122 and the second tension element 124, respectively, to increase a wrap angle (e.g., contact area) against the differential drum 116. The first pair of idlers 118 and the second pair of idlers 120 may also be spring-loaded to act as a tensioner, to accommodate stretching of the first tension element 122 and the second tension element 124. The bight 122*c* of the first tension element 122 and the bight 124*c* of the second tension element 124 may be aligned in parallel planes by the first pair of idlers 118 and the second pair of idlers 120.

The rotation of the differential drum 116 may drive the action of the first differential windlass 106 and the second differential windlass 108. The first differential windlass 106 and the second differential windlass 108 may act simultaneously and in opposing directions. The action of the first differential windlass 106 and the second differential windlass 108 may include winding and unwinding opposing ends of both the first tension element 122 and the second tension element 124 on the differential drum 116 and may include translating the first hanging pulley 125 and the second hanging pulley 126. The first differential windlass 106 may be wound opposite to the second differential windlass 108 such that the first hanging pulley 125 and the second hanging pulley 126 translate in opposing directions as the differential drum 116 is rotated. Rotation of the differential drum 116 may cause the first hanging pulley 125 and the second hanging pulley 126 to translate in opposing directions via the first tension element 122 and the second tension element 124. With rotation of the differential drum 116, the first diameter sections 116*a* and the second diameter sections 116*b* winds or unwinds a different length of the first tension element 122 and/or the second tension element 124. This causes the total length wound around the first hanging pulley 125 and the second hanging pulley 126 to change, raising or lowering the first hanging pulley 125 and the second hanging pulley 126. As the differential drum 116 is rotated in a first direction, the first hanging pulley 125 translates towards the differential drum 116 and the second hanging pulley 126 translates towards the winding drum 128. Similarly, as the differential drum 116 is rotated in a second direction opposite to the first direction, the first hanging pulley 125 translates towards the winding drum 128 and the second hanging pulley 126 translates towards the differential drum 116. Thus, the windlasses are wound opposed to each other so that as the shaft rotates, one windlass will raise its respective hoist while the other will lower its hoist. The translation of the first hanging pulley 125 and the second hanging pulley 126 may include lowering and raising the first hanging pulley 125 and the second hanging pulley 126 towards and away from the winding drum 128. The first hanging pulley 125 and the second hanging pulley 126 may be translated at a same rate in opposing directions. The length of travel of the first hanging pulley 125 and the second hanging pulley 126 may be defined by the lengths of the first tension element 122 and the second tension element 124.

The first diameter sections 116*a* may be relatively close in diameter to the second diameter sections 116*b*. For example, the first diameter sections 116*a* may be within 10%, 5%, 2%, 1% or the like of the second diameter sections 116*b*. The first diameter sections 116*a* being relatively close in diameter to the second diameter sections 116*b* may be beneficial to increase the mechanical advantage.

The robotic limb 100 may include little to no backlash. For example, the robotic limb 100 may be driven by tension elements and not by gears. The tension elements may provide no backlash. The no backlash may be beneficial to controlling the robotic limb 100.

The first diameter sections 116*a* and the second diameter sections 116*b* may be smooth along the axial length (as depicted). The first diameter sections 116*a* and the second diameter sections 116*b* may include circumferential grooves (not depicted). The circumferential grooves may be beneficial for consistently winding the first tension element 122 and the second tension element 124 on the differential drum 116.

The second rigid member 104 may be referred to as a lower leg and/or a forearm. The second rigid member 104 may include the linkage 114 and the winding drum 128. The linkage 114 and the winding drum 128 may be rigidly affixed to form the second rigid member 104. For example, the linkage 114 and the winding drum 128 may be bolted together.

The linkage 114 may define a through-hole 148. The through-hole 148 may provide for connection to an ankle joint, a wrist joint, or the like. The through-hole 148 and the winding drum 128 may be disposed at opposing ends of the second rigid member 104.

The second rigid member 104 may be supported by and configured to rotate relative to the first rigid member 102. The first rigid member 102 and the second rigid member 104 may form a knee joint or elbow joint. For example, the second rigid member 104 may be coupled with the first rigid member 102 by a revolute joint by which the second rigid member 104 may be supported by and configured to rotate relative to the first rigid member 102. For instance, a shaft 138 of the first rigid member 102 may form the revolute joint with the second rigid member 104 via bearings 140 coupled with the winding drum 128. Angular rotation by the winding drum 128 may be matched by the linkage 114 and/or the second rigid member 104.

The third tension element 130 and the fourth tension element 132 may be held in tension. The third tension element 130 may be held in tension by the first hanging pulley 125 and the winding drum 128. Similarly, the fourth tension element 132 may be held in tension by the second hanging pulley 126 and the winding drum 128. The third tension element 130 and the fourth tension element 132 may be non-endless tension elements. The third tension element 130 and the fourth tension element 132 may include first ends and second ends. For example, the third tension element 130 may include a first end 130*a* and a second end 130*b*. By way of another example, the fourth tension element 132 may include a first end 132*a* and a second end 132*b*.

The opposing ends of the third tension element 130 and opposing ends of the fourth tension element 132 may be affixed to the winding drum 128 and respective of the first hanging pulley 125 and the second hanging pulley 126. For example, the first end 130*a* of the third tension element 130 may be affixed to the first hanging pulley 125 (e.g., to the attachment end 144 of the first hanging pulley 125) and the second end 130*b* of the third tension element 130 may be affixed to the winding drum 128. By way of another example, the first end 132*a* of the fourth tension element 132 may be affixed to the second hanging pulley 126 (e.g., to the attachment end 144 of the second hanging pulley 126) and the second end 132*b* of the fourth tension element 132 may be affixed to the winding drum 128. The winding drum 128 may considered a drum and not a pulley, in that the third tension element 130 and the fourth tension element 132 are looped over and affixed to the winding drum 128.

The attachment ends 144 of the first hanging pulley 125 and the second hanging pulley 126 may include any suitable type of attachment end for affixing to the first end 130*a* of the third tension element 130 and the first end 132*a* of the fourth tension element 132, respectively. For example, the attachment ends 144 may include as a clevis, an eyelet, a shackle, or the like.

The third tension element 130 and the fourth tension element 132 may be radially aligned and axially offset on the winding drum 128. The third tension element 130 and the fourth tension element 132 may be looped over the winding drum 128 in opposing directions. The third tension element 130 and the fourth tension element 132 may be looped with opposite handedness over the winding drum 128. For example, the third tension element 130 and the fourth tension element 132 may be looped with clockwise and counterclockwise handedness, respectively, over the winding drum 128. The winding drum 128 may define grooves (not depicted), side-by-side axially. The grooves may axially offset the third tension element 130 and the fourth tension element 132.

The translation of the first hanging pulley 125 and the second hanging pulley 126 in opposing directions may cause the second rigid member 104 to rotate via the third tension element 130 and the fourth tension element 132. Because the third tension element 130 and the fourth tension element 132 only carry tension, both the first hanging pulley 125 and the second hanging pulley 126 may be used to rotate the winding drum 128, one in each direction. The tension of the third tension element 130 coupling between the first hanging pulley 125 and the winding drum 128 may cause the winding drum 128 to rotate in a first direction when the first hanging pulley 125 is translated towards the differential drum 116. Similarly, the tension of the fourth tension element 132 coupling between the second hanging pulley 126 and the winding drum 128 may cause the winding drum 128 to rotate in a second direction opposite to the first direction when the second hanging pulley 126 is translated towards the differential drum 116.

The second rigid member 104 may include a range of motion. The range of motion may be oscillating. The oscillating motion may refer to motion about the bearings 140 to an extent not exceeding one revolution, the movement being alternately forwards and backwards during continued operation of the robotic limb 100. The range of motion may be based on the geometry of the robotic limb 100. In the example depicted, the robotic limb 100 may include a range of motion of 80 degrees, although this is not intended to be limiting. It is contemplated that the range of motion may be up to 165 degrees.

The robotic limb 100 may include a mechanical advantage. The mechanical advantage may also be referred to as purchase. The mechanical advantage may refer to the torque input from the motor 110 compared to the torque output at the second rigid member 104. The transmission 112, the first differential windlass 106, the second differential windlass 108, and/or the winding drum 128 may provide the mechanical advantage. The mechanical advantage of the transmission 112 may be the gear-ratio. The mechanical advantage of the first differential windlass 106 and the second differential windlass 108 may be based on the difference in diameter between the first diameter sections 116*a* and the second diameter sections 116*b*. The mechanical advantage may be defined as two times the radius of the drive shaft 134 divided by the difference of the second diameter sections 116*b* to the first diameter sections 116*a* (e.g., Purchase=2(Input Radius)/(Large Drum Radius−Small Drum Radius)). The mechanical advantage of the winding drum 128 may be based on the diameters at which the third tension element 130 and the fourth tension element 132 are loop over and affixed to the winding drum 128. The mechanical advantage of the robotic limb 100 may be a select value, such as, but not limited to, 25:1, 50:1, 80:1, 100:1 or the like. The robotic limb 100 may not require precision components to provide such high ratios.

The robotic limb 100 may lock the second rigid member 104 at a select angle by disengaging the motor 110. The motor 110 may be used as a brake to lock the second rigid member 104 relative to the first rigid member 102. The first differential windlass 106 and the second differential windlass 108 may not be back-drivable, such that reflected inertia from the second rigid member 104 may not rotate the motor 110.

The differential drum 116, the first pair of idlers 118, the second pair of idlers 120, the pulley ends 142 of the first hanging pulley 125 and the second hanging pulley 126, and/or the winding drum 128 may include center axes. The center axes of the differential drum 116, the first pair of idlers 118, and/or the second pair of idlers 120 may be aligned in parallel. The center axes of the first hanging pulley 125 (e.g., the pulley end 142 of the first hanging pulley 125), the second hanging pulley 126 (e.g., the pulley ends 142 of the second hanging pulley 126), and the winding drum 128 may also be aligned in parallel. Center axes of the differential drum 116, the first pair of idlers 118, and the second pair of idlers 120 may be aligned perpendicular to center axes of the first hanging pulley 125, the second hanging pulley 126 and the winding drum 128.

In embodiments, the differential drum 116 may include two of the first diameter sections 116*a* and one of the second diameter sections 116*b*, with the one of the second diameter sections 116*b* being axially disposed between the two of the first diameter sections 116*a*. The one of the second diameter sections 116*b* may be the center portion of the differential drum 116. The two of the first diameter sections 116*a* may each include the same diameter. Both the second end 122*b* of the first tension element 122 and the second end 124*b* of the second tension element 124 may be wound on the one of the second diameter sections 116*b*. The first diameter sections 116*a* on which the first end 122*a* of the first tension element 122 is wound may be axially separated from the first diameter sections 116*a* on which the first end 124*a* of the second tension element 124 is wound by the second diameter sections 116*b* on which both the second end 122*b* of the first tension element 122 and the second end 124*b* of the second tension element 124 are wound. The rotation of the differential drum 116 may cause the first tension element 122 and the second tension element 124 simultaneously wind onto either the first diameter sections 116*a* or the second diameter sections 116*b* and unwind from the other of the first diameter sections 116*a* or the one of second diameter sections 116*b*, respectively, causing the translation of the first hanging pulley 125 and the second hanging pulley 126. The two of the first diameter sections 116*a* may require precise tolerancing to ensure that the first tension element 122 and the second tension element 124 wind and unwind at a same rate.

In embodiments, the first pair of idlers 118 and the second pair of idlers 120 may be coaxial, such that the first pair of idlers 118 and the second pair of idlers 120 share a center axis. The first pair of idlers 118 may be smaller in diameter than the second pair of idlers 120. Providing the first pair of idlers 118 and the second pair of idlers 120 coaxial together with the different diameters may cause the bight 122*c* of the first tension element 122, the first hanging pulley 125, and/or the third tension element 130 to be in an offset plane from the bight 124*c* of the second tension element 124, the second hanging pulley 126, and/or the fourth tension element 132. The arrangement of the first pair of idlers 118 and the second pair of idlers 120 coaxial together with the different diameters may be beneficial for axially offsetting the second end 130*b* of the third tension element 130 from the second end 132*b* of the fourth tension element 132 on the winding drum 128.

FIGS. 2A-2H depict the robotic limb 100, in accordance with one or more embodiments of the present disclosure.

In embodiments, the center axes of the differential drum 116, the first pair of idlers 118, the second pair of idlers 120, and/or the winding drum 128 may be aligned in parallel. The center axes of the first hanging pulley 125 and the second hanging pulley 126 may be aligned in parallel. Center axes of the differential drum 116, the first pair of idlers 118, the second pair of idlers 120, and/or the winding drum 128 may be aligned perpendicular to center axes of the first hanging pulley 125 and the second hanging pulley 126.

In embodiments, the differential drum 116 may include one of the first diameter sections 116*a* and one of the second diameter sections 116*b*. Both the first end 122*a* of the first tension element 122 and the first end 124*a* of the second tension element 124 may be wound on the one of the first diameter sections 116*a*. Similarly, both the second end 122*b* of the first tension element 122 and the second end 124*b* of the second tension element 124 may be wound on the one of the second diameter sections 116*b*. Using one of the first diameter sections 116*a* and one of the second diameter sections 116*b* for the first tension element 122 and the second tension element 124 may be beneficial to ensure that the first tension element 122 and the second tension element 124 wind and unwind at a same rate.

Although the first pair of idlers 118 and the second pair of idlers 120 are described as coaxial, this is not intended as a limitation of the present disclosure. In embodiments, a center axis of the first pair of idlers 118 may be offset from a center axis of the second pair of idlers 120. For example, the differential drum 116 may be disposed between the first pair of idlers 118 and the second pair of idlers 120.

Figure 3:
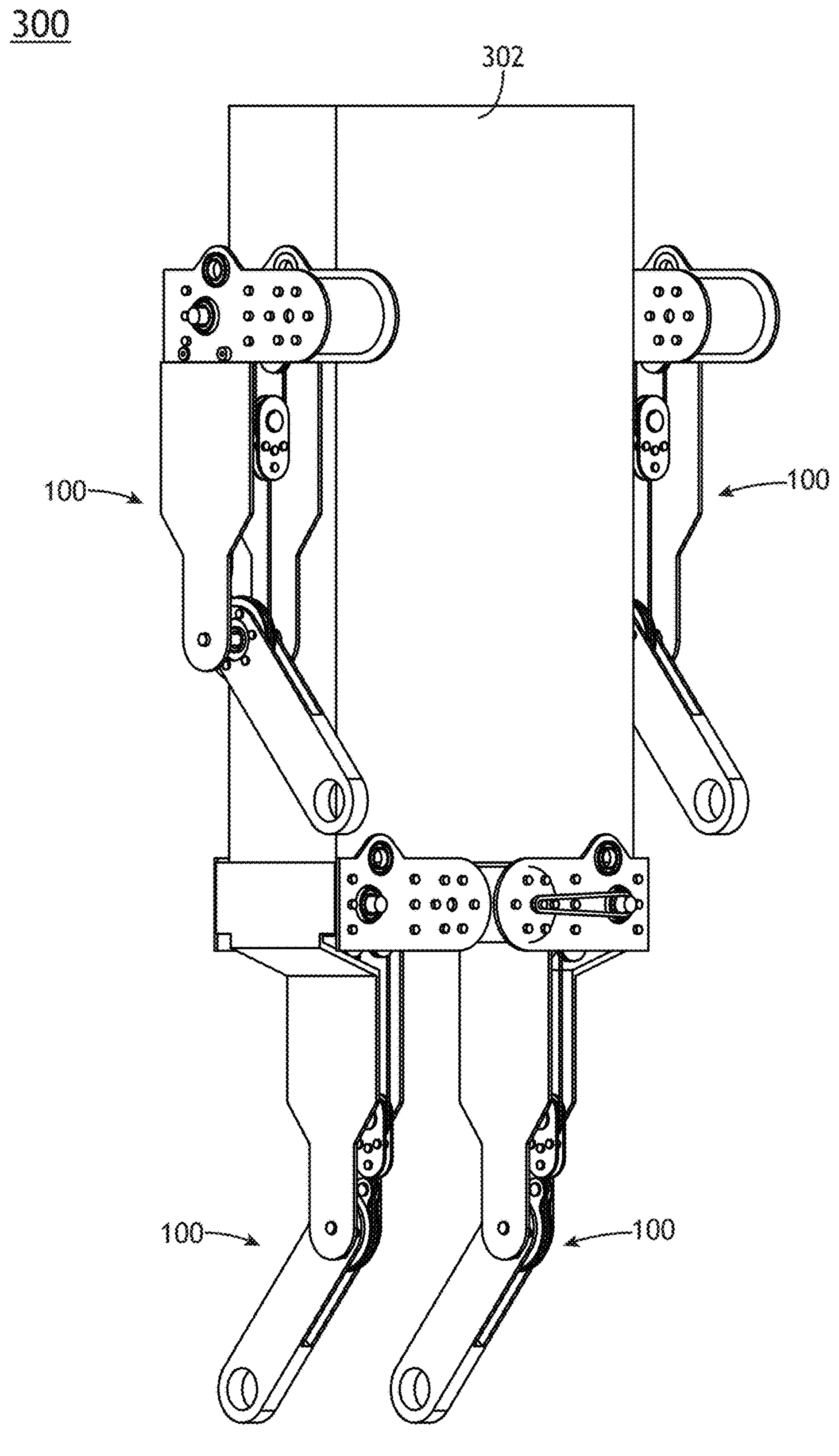
FIG. 3 depicts a perspective view of a robot with the robotic limbs, in accordance with one or more embodiments of the present disclosure.

FIG. 3 depicts a robot 300, in accordance with one or more embodiments of the present disclosure. The robot 300 may be a humanoid robot which is bipedal with the robotic limbs 100 being the upper limbs and/or lower limbs of the robot 300. The robotic limbs 100 may be coupled to a body 302 of the robot 300. The robot 300 may include manipulators (not depicted) coupled to the second rigid member 104, such as, but not limited to, hands and feet.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, the term "axial" and derivatives thereof, such as "axially," shall be understood to refer to a direction along the axis. The term "coaxial" shall be understood to refer to a common axis. Further, the term "radial" and derivatives thereof, such as "radially," shall be understood in relation to the axis. For example, "radially outward" refers to further away from the axis, while "radially inward" refers to nearer to the axis. The term "circumference" or derivatives thereof, such as "circumferentially", may also be defined in reference to the center axis.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

As used herein, bearings may refer to any suitable bearings, such as, but not limited to, plain bearings (e.g., bushings), rolling-element bearings, cylindrical bearings, ball bearings, roller bearings, needle bearings, or the like. The bearings may support a radial load and/or an axial load.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 robotic limb
102 first rigid member
104 second rigid member
106 first differential windlass
108 second differential windlass
110 motor
112 transmission
114 linkage
116 differential drum
**116*a*** first diameter sections
**116*b*** second diameter sections
118 idlers
120 idlers
122 first tension element
**122*a*** first end
**122*b*** second end
**122*c*** bight
124 second tension element
**124*a*** first end
**124*b*** second end
**124*c*** bight
125 first hanging pulley
126 second hanging pulley
128 winding drum
130 third tension element
**130*a*** first end
**130*b*** second end
132 fourth tension element
**132*a*** first end
**132*b*** second end
134 drive shaft
136 bearings
138 shaft
140 bearings
142 pulley ends
144 attachment ends
146 bearings
148 through-hole
300 robot
302 body

What is claimed:

1. A robotic limb comprising:
- a first rigid member;
- a second rigid member comprising a winding drum;
- a differential drum, the second rigid member and the differential drum are supported by and rotate relative to the first rigid member;
- a first differential windlass comprising:
  - a first pair of idlers;
  - a first tension element; and
  - a first hanging pulley;
- a second differential windlass comprising:
  - a second pair of idlers;
  - a second tension element; and
  - a second hanging pulley, the first hanging pulley and the second hanging pulley are suspended from the differential drum by respective of the first tension element and the second tension element, rotation of the differential drum causes the first hanging pulley and the second hanging pulley to translate in opposing directions via the first tension element and the second tension element;
- a third tension element; and
- a fourth tension element, the first hanging pulley and the second hanging pulley are suspended from the winding drum by respective of the third tension element and the fourth tension element, translation of the first hanging pulley and the second hanging pulley in opposing directions causes the second rigid member to rotate via the third tension element and the fourth tension element, center axes of at least the differential drum, the first pair of idlers, and the second pair of idlers are aligned perpendicular to center axes of at least the first hanging pulley and the second hanging pulley, the first tension element is wound over the first pair of idlers on a same side, the second tension element is wound over the second pair of idlers on a same side.

2. The robotic limb of claim 1, wherein the second rigid member comprises a linkage, wherein the linkage and the winding drum are affixed.

3. The robotic limb of claim 1, comprising a motor, wherein the motor is supported by the first rigid member, wherein the motor is configured to cause the differential drum to rotate relative to the first rigid member.

4. The robotic limb of claim 3, comprising a transmission, wherein the transmission couples the motor to the differential drum.

5. The robotic limb of claim 3, wherein the robotic limb is configured to lock the second rigid member by disengaging the motor.

6. The robotic limb of claim 1, wherein the first tension element is held in tension by the differential drum, the first pair of idlers, and the first hanging pulley, wherein the second tension element is held in tension by the differential drum, the second pair of idlers, and the second hanging pulley, wherein the third tension element is held in tension by the first hanging pulley and the winding drum, wherein the fourth tension element is held in tension by the second hanging pulley and the winding drum.

7. The robotic limb of claim 1, wherein the first pair of idlers and the second pair of idlers are mounted to and configured to rotate relative to the first rigid member.

8. The robotic limb of claim 1, wherein the first hanging pulley and the second hanging pulley each comprise a pulley end and an attachment end, wherein the pulley end is configured to rotate relative to the attachment end, wherein a bight of the first tension element and a bight of the second tension element are looped around respective of the pulley end of the first hanging pulley and the pulley end of the second hanging pulley, wherein the third tension element is affixed to the attachment end of the first hanging pulley, wherein the fourth tension element is affixed to the attachment end of the second hanging pulley.

9. The robotic limb of claim 8, wherein the bight of the first tension element and the bight of the second tension element are aligned in parallel planes by the first pair of idlers and the second pair of idlers.

10. The robotic limb of claim 1, wherein the differential drum comprises one or more first diameter sections and one or more second diameter sections, wherein the one or more first diameter sections and the one or more second diameter sections are coaxial, wherein opposing ends of the first tension element and opposing ends of the second tension element are wound over and affixed to the one or more first diameter sections and the one or more second diameter sections.

11. The robotic limb of claim 10, wherein the center axes of the differential drum, the first pair of idlers, and the second pair of idlers are aligned perpendicular to the center axes of the first hanging pulley, the second hanging pulley, and the winding drum.

12. The robotic limb of claim 11, wherein the first pair of idlers and the second pair of idlers are coaxial, wherein the first pair of idlers are smaller in diameter than the second pair of idlers.

13. The robotic limb of claim 12, wherein the differential drum comprises two of the one or more the first diameter sections and one of the one or more second diameter sections, wherein the one of the one or more second diameter sections are axially disposed between the two of the one or more the first diameter sections.

14. The robotic limb of claim 10, wherein the center axes of the differential drum, the first pair of idlers, the second pair of idlers, and the winding drum are aligned perpendicular to the center axes of the first hanging pulley and the second hanging pulley.

15. The robotic limb of claim 14, wherein the center axes of the first pair of idlers and the second pair of idlers are offset, wherein the differential drum is disposed between the first pair of idlers and the second pair of idlers.

16. The robotic limb of claim 15, wherein the differential drum include one of one or more first diameter sections and one of the one or more second diameter sections.

17. The robotic limb of claim 1, wherein opposing ends of the third tension element and opposing ends of the fourth tension element are affixed to the winding drum and respective of the first hanging pulley and the second hanging pulley.

18. The robotic limb of claim 17, wherein the third tension element and the fourth tension element are radially aligned and axially offset on the winding drum, wherein the third tension element and the fourth tension element are looped over the winding drum in opposing directions.

19. A robot comprising:

a plurality of robotic limbs comprising:

a first rigid member;

a second rigid member comprising a winding drum;

a differential drum, the second rigid member and the differential drum are supported by and rotate relative to the first rigid member;

a first differential windlass comprising:

a first pair of idlers;

a first tension element; and a first hanging pulley;

a second differential windlass comprising:

a second pair of idlers;

a second tension element; and a second hanging pulley, the first hanging pulley and the second hanging pulley are suspended from the differential drum by respective of the first tension element and the second tension element, rotation of the differential drum causes the first hanging pulley and the second hanging pulley to translate in opposing directions via the first tension element and the second tension element;

a third tension element; and a fourth tension element, the first hanging pulley and the second hanging pulley are suspended from the winding drum by respective of the third tension element and the fourth tension element, translation of the first hanging pulley and the second hanging pulley in opposing directions causes the second rigid member to rotate via the third tension element and the fourth tension element, center axes of at least the differential drum, the first pair of idlers, and the second pair of idlers are aligned perpendicular to center axes of at least the first hanging pulley and the second hanging pulley, the first tension element is wound over the first pair of idlers on a same side, the second tension element is wound over the second pair of idlers on a same side.

20. The robot of claim 19, wherein the robot is a humanoid robot which is bipedal.

* * * * *